(12) United States Patent
Lillard

(10) Patent No.: US 9,191,512 B1
(45) Date of Patent: *Nov. 17, 2015

(54) SENDING CALLBACK TEXT MESSAGES FROM A CONTACT CENTER

(71) Applicant: Noble Systems Corporation, Atlanta, GA (US)

(72) Inventor: Brian T. Lillard, Canton, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/710,697

(22) Filed: May 13, 2015

Related U.S. Application Data

(63) Continuation of application No. 14/511,616, filed on Oct. 10, 2014, now Pat. No. 9,065,915.

(51) Int. Cl.
| H04M 3/00 | (2006.01) |
| H04M 5/00 | (2006.01) |
| H04M 3/523 | (2006.01) |
| H04M 3/51 | (2006.01) |
| H04M 3/42 | (2006.01) |

(52) U.S. Cl.
CPC ........ *H04M 3/5231* (2013.01); *H04M 3/42382* (2013.01); *H04M 3/5183* (2013.01); *H04M 3/5232* (2013.01)

(58) Field of Classification Search
USPC ............................ 379/265.09, 265.05, 265.11
See application file for complete search history.

(56) References Cited

U.S. PATENT DOCUMENTS

| 6,724,887 | B1 | 4/2004 | Eilbacher et al. |
| 7,245,711 | B2 | 7/2007 | Margolis |
| 7,254,641 | B2 | 8/2007 | Broughton et al. |
| 8,050,921 | B2 | 11/2011 | Mark et al. |
| 8,150,021 | B2 | 4/2012 | Geva et al. |
| 8,472,612 | B1 | 6/2013 | Goringe et al. |
| 8,554,567 | B2 | 10/2013 | Spier et al. |
| 8,665,863 | B2 | 3/2014 | Silverman |
| 8,705,711 | B2 | 4/2014 | Hamerschlag et al. |
| 2007/0121824 | A1 | 5/2007 | Agapi et al. |
| 2013/0223618 | A1 | 8/2013 | Hemm et al. |
| 2014/0064474 | A1 | 3/2014 | Mathur et al. |
| 2014/0226809 | A1 | 8/2014 | King |

FOREIGN PATENT DOCUMENTS

WO    WO2014/016661 A2    1/2014

Primary Examiner — Quynh Nguyen

(57) ABSTRACT

Various embodiments of the invention provide a callback text message to a party who has placed an inbound call received by a contact center. Specifically, the inbound call is received by the contact center and placed into a queue to wait for an available agent. At this point, a condition is detected such as the call remaining in the queue for at least a minimum amount of time, the call expected to remain in the queue for at least a minimum amount of time, and/or the call becoming disconnected with the contact center. Accordingly, one or more parameters associated with inbound calls received by the contact center are monitored in particular embodiments and after the condition is detected and upon the one or more parameters reaching threshold values, a text message is sent to the party recommending to the party to place a subsequent inbound call to the contact center.

22 Claims, 8 Drawing Sheets

SENDING CALLBACK TEXT MESSAGES FROM A CONTACT CENTER

CROSS REFERENCE TO RELATED APPLICATIONS

This application is a continuation of U.S. patent application Ser. No. 14/511,616, entitled Sending Callback Text Messages from a Contact Center and filed on Oct. 10, 2014, the entire contents of which are incorporated by reference for all that they teach.

BACKGROUND

Contact centers (also referred to as call centers) are used by various organizations to provide communication channels to the organizations' customers. For example, various organizations may utilize contact centers so that customers may contact the organizations with regard to issues customers may be having with the organizations' products and/or to place orders for the organizations' products. Typically, a contact center employs a number of agents that assist customers who have contacted the contact center. However, in many instances, the contact center may receive more calls than it has agents currently available to handle the calls. Therefore, the contact center may make use of one or more queues for holding calls until agents become available to handle the calls.

With that said, a queue at a contact center can build up to a point that the wait time for an available agent for any one call held in the queue becomes increasingly longer. As a result, calling parties may become impatient and/or frustrated, resulting in the parties hanging up and abandoning the calls. These abandoned calls can lead to missed opportunities for the contact center to converse (do business) with these calling parties as well as create bad will on the part of frustrated calling parties with respect to the contact center.

Over the last few years, the contact center industry has attempted to address these abandoned calls by placing callback calls at later times when agents are available to calling parties who have abandoned calls while waiting for available agents. However, because such a call is initiated by the contact center, a calling party may not always be available to receive a callback call when it is placed by the contact center or it may be an inconvenient time for the calling party to take the call. Thus, a need in the industry exists to improve the process for handling excessive calls being held in an inbound queue while waiting in the queue, as well as abandoned calls, to ensure a higher success rate for establishing contact with the parties associated with such calls. It is with respect to these considerations and others that the disclosure herein is presented.

BRIEF SUMMARY

In general, embodiments of the present invention provide computer program products, methods, systems, apparatus, and computing entities for providing a callback text message to a party who has placed an inbound call received by a contact center. In various embodiments, the contact center places an inbound call received by the center into a queue to wait for an available agent that can service the inbound call. In addition, in particular embodiments, the contact center monitors one or more parameters associated with inbound calls received by the center such as, for instance, a number of agents currently available to handle inbound calls, an average wait time for inbound calls placed in the queue, a total number of calls currently in the queue, and a volume of inbound calls forecasted to be received by the contact center for a future period of time.

Accordingly, a condition may be detected with respect to the inbound call placed in the queue such as the call remaining in the queue for at least a minimum amount of time, the call expected to remain in the queue for at least a minimum amount of time, and/or the call becoming disconnected with the contact center. That is to say, the party who placed the inbound call may become impatient while waiting in the queue for an available agent and abandon the call. Thus, after the call center detects such a condition for the inbound call and upon the one or more parameters reaching one or more threshold values, the contact center sends a text message to a processing device associated with the party who placed the inbound call recommending to the party to place a subsequent inbound call to the contact center.

In particular embodiments, the text message may include priority information that can be used by the party upon placing the subsequent inbound call to the contact center to facilitate the contact center prioritizing the subsequent inbound call over other inbound calls received by the contact center. In addition, in particular embodiments, the text message may include a phone number configured to be selected by the party to originate the subsequent inbound call by the processing device to the contact center. Further, in particular embodiments, the text message may include an appropriate time during which the party should place the subsequent inbound call to the contact center.

In various embodiments, the process for sending the text message may involve verifying the party has provided consent to receive the text message prior to sending the text message to the party's processing device. In addition, the text message may be sent along with a plurality of text messages to other parties who placed inbound calls to the contact center recommending to the parties to place subsequent inbound calls to the contact center. In these particular instances, the number of text messages sent may be based on the one or more parameters that are monitored.

As is discussed in greater detail below, the subject matter disclosed herein may be implemented as a computer-controlled apparatus, a method, a computing system, or as an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
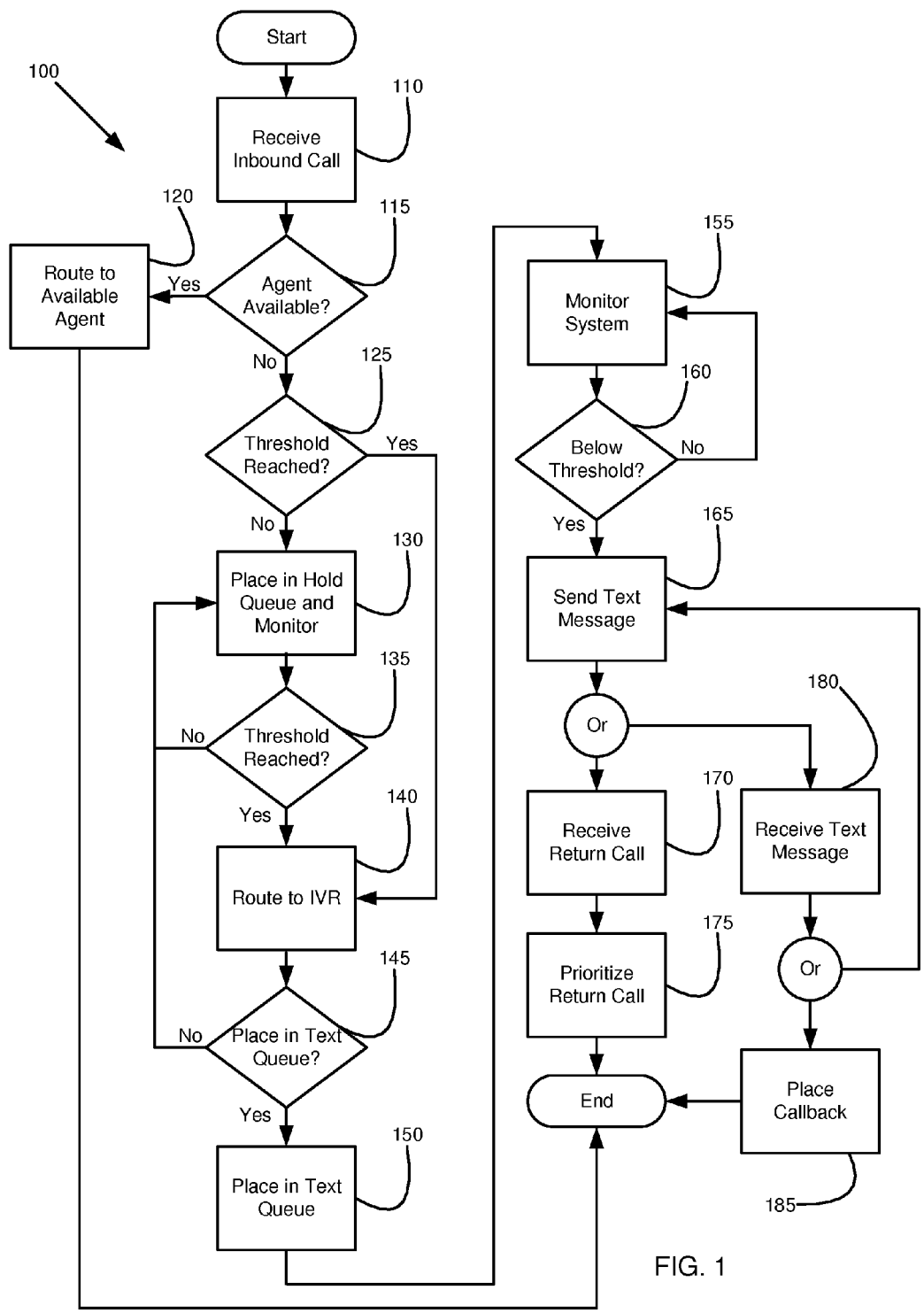
FIG. 1 illustrates a general process for sending callback text messages according to various embodiments of the invention.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Overview of General Process

FIG. 1 illustrates a general process flow for receiving an inbound call at a contact center, queuing the call to receive a callback text message, and sending a callback text message to the originator of the call (e.g., the calling party) identifying an appropriate time for the originator to place a subsequent inbound call to the contact center or receive an outbound call from the contact center. An example is now provided for purposes of explaining the general process in which a calling party places an inbound call to a contact center seeking technical support help. In this instance, the calling party has recently purchased a new printer for his home computer and is trying to install the printer. However, the party is having trouble connecting the new printer to his home Wi-Fi network. Therefore, the party has placed a call to the contact center seeking help in solving this problem.

Turning now to FIG. 1, the process 100 begins with the contact center receiving the inbound call placed by the calling party in Step 110. Depending on the contact center, in certain instances, the center may first direct the inbound call to an interactive voice response system ("IVR") to determine information pertaining to the call. In general, an IVR is an automated system that can gather information from the calling party before routing the inbound call to an available contact center agent to assist the calling party. For instance, in particular embodiments, the IVR may inquire as to why the calling party is calling the contact center, may gather information about the calling party's identity that can be used to look up information the contact center may already have stored for the calling party, and/or may request permission from the calling party to send the party text messages when appropriate.

For example, the IVR may ask the calling party to "select from the following choices, if you are calling about a router issue please select one or say yes now, if you are calling about a laptop issue please select two or say yes now, if you are calling about a printer issue please select three or say yes now, if you are calling about a backup drive issue please select four or say yes now, for all other issues, please remain on the line and an agent will be available shortly to assist you." Thus, in this instance, the calling party selects the number three on the keypad of his phone or says "yes" into the phone at the appropriate time for making the selection for a call about a printer issue.

In response, the IVR may then route the inbound call to an appropriate group of agents who are trained to handle the calling party's issue. At this point, the contact center determines whether an agent is available who can handle the inbound call in Step 115. That is to say, if the IVR has identified an appropriate group of agents who are trained to handle the calling party's issue, the IVR (or some other component within the contact center's system) determines whether any of the agents in the appropriate group are currently available to handle the inbound call. If so, then the inbound call is routed to the available agent in Step 120.

However, if an agent is currently not available to handle the inbound call, then the contact center may determine whether one or more monitored parameters have reached some threshold in Step 125 that may indicate the wait time for an available agent may be long. For instance, in particular embodiments, the contact center may determine whether the current volume of inbound calls received by the center is above some threshold amount of volume and/or whether the current average wait time for inbound calls waiting for available agents is above some threshold amount of time. For example, the contact center may determine whether the current average wait time for available agents is above the threshold value of twenty minutes. The contact center may initially make such a determination in various embodiments so that the inbound call received from the calling party can be handled more quickly and appropriately in instances in which the contact center is currently experiencing a high volume of inbound calls and the calling party may be required to wait for an extended period of time before being routed to an available agent.

Thus, if the contact center determines the threshold has been reached, then the contact center routes the inbound call to an IVR in Step 140. At this point, the IVR can inform the calling party that the contact center is currently experiencing a high volume of calls and as a result, the expected wait time for an available agent to handle the calling party's call is long. Accordingly, the IVR may inquire as to whether the calling party would like to receive a text message providing an appropriate time when the calling party should place a subsequent inbound call to the contact center instead of being placed on hold to wait for an available agent. In other embodiments, the IVR may inquire as to whether the calling party would like to receive a text message indicating an appropriate time for the contact center to place an outbound call (e.g., a callback) to the calling party instead of, or in addition to, having the calling party place a subsequent inbound call to the contact center. In some instances, this may be a more attractive option for the calling party. For example, the party may normally be charged by his service provider for placing a call to the contact center. Therefore, the calling party may be able to avoid such a charge if the contact center places an outbound call to the calling party instead of the calling party placing a subsequent inbound call to the contact center.

Accordingly, in various embodiments, an appropriate time for a calling party to place a subsequent call to the contact center or the contact center to place an outbound call to the calling party is a time that is generally beneficial to both the contact center and the calling party. For example, in particular embodiments, an appropriate time may be when the inbound call volume is at a low level for the contact center, when the average wait time in the queue for an available agent is at a minimum threshold, when a minimal number of agents are currently available to handle inbound calls and/or to place outbound calls, and/or when the current utilization of agents is at a minimum threshold. While in other embodiments, the appropriate time may be when the contact center is forecasted to have a low volume of calls and/or when additional agents are scheduled to begin work and will be available to handle inbound calls and/or to place outbound calls. These times may be generally viewed as beneficial to both the contact center and the calling party because these times identify instances when the contact center has sufficient resources (e.g., agents) available to effectively handle inbound calls or place outbound calls. Those of ordinary skill in the art can envision other criteria that may be used in identifying an appropriate time for a calling party to place a subsequent inbound call to the contact center and/or the contact center to place an outbound call to the calling party in light of this disclosure.

Thus, the IVR inquires whether the calling party would like to receive a text message identifying one of these appropriate times. In response, the calling party may indicate yes, he would like to receive such a text message or no, he would not like to receive such a text message. Accordingly, a determination is made as to whether to place the inbound call in a text queue or not based on whether the calling party would like to receive such a text message in Step 145.

If the calling party indicates that he would not like to receive such a text message, the IVR may inquire as to whether the calling party would like to be placed on hold and wait for an available agent. If the calling party indicates that he would like to be placed on hold, then the call is placed in a hold queue to wait for an available agent in Step 130. In this instance, the hold queue generally involves a list of inbound calls waiting for available agents. Typically as agents become available, calls are selected from the hold queue on a first-in, first-out ("FIFO") basis so that the calls that have been waiting in the hold queue the longest are the next calls to be serviced once agents become available. However, some contact centers may not necessarily follow a FIFO approach with respect to selecting inbound calls from a hold queue. For example, a call center may prioritize calls placed in a hold queue so that these calls are serviced before other (non-prioritized or lower prioritized) calls in the queue. Those of ordinary skill in the art can envision numerous approaches that may be used in selecting calls from a hold queue.

In addition, it should be noted that placing a call in a hold queue does not necessarily mean the call is physically placed in some structure that is referred to as a "queue." Typically, placing a call in a hold queue involves placing the call on hold and placing some type of identifier for the call in a memory structure representing the hold queue. For instance, in particular embodiments, the hold queue may be a table found in a database in which identifiers for the various calls are placed in the table and processed accordingly. While in other embodiments, the hold queue may be a file or some other type of similar data structure in which identifiers for the various calls are placed and processed accordingly. Thus, once a call has been selected from the hold queue (e.g., the identifier for the call is read from the corresponding data structure), the call is taken off hold and routed to an available agent for handling. In the hold queue, the existence of the call identifier in the data structure is correlated with the existence of the call itself. Thus, if the caller abandons the call, the corresponding call identifier in the hold queue is normally removed.

Returning now to Step 145, if however the calling party indicates that he would like to receive such a text message, then an identifier correlated to the call is placed in a text queue in Step 150. This is sometimes referred to herein as "placing the call in the text queue" although unlike the hold queue, the call identifier in the text queue data structure is not correlated to the existence of the call itself. In this instance, the identifier for the inbound call (and/or calling party) is placed in the text queue and remains in the text queue once the inbound call is disconnected with the contact center (e.g., abandoned) instead of remaining on hold for an available agent.

Looking now to Step 130, as an inbound call waits in the hold queue for an available agent, the contact center may track how long the call has remained in the queue. Accordingly, in Step 135, the contact center may determine whether the call has remained in the hold queue beyond some threshold amount of time. For instance, in particular embodiments, the threshold may be set at ten minutes, fifteen minutes, or thirty minutes. In addition, the contact center may monitor for other conditions with respect to the inbound call such as, for example, monitoring to determine if the calling party has become impatient and has hung up and abandoned the call.

Accordingly, if the contact center determines the inbound call has remained in the hold queue up to or beyond the threshold amount of time, the contact center then routes the call to the IVR in Step 135. At this point, similar to the discussion above, the IVR inquires as to whether the calling party would like to discontinue the call and be contacted via a text message providing an appropriate time when the calling party should place a subsequent inbound call to the contact center or an appropriate time when the contact center can place an outbound call to the calling party. Again, the calling party may indicate yes, he would like to receive such a text message or may indicate no, he would not like to receive such a text message, and accordingly a determination is made as to whether to place the call in the text queue or not in Step 145.

At this point, if the call is placed in the text queue in Step 150, then the contact center monitors one or more parameters of its system to determine when an appropriate time occurs for the calling party to place a subsequent inbound call to the contact center or the contact center to place an outbound call to the calling party in Step 155. In various embodiments, such times are those in which agents are more readily available to handle inbound calls and/or to place outbound calls. These times may reflect a present or future time for the contact center. For instance, depending on the embodiment, the contact center may monitor: (1) the current volume of inbound calls the center is handling and identify an appropriate time when the volume drops below a threshold amount; (2) a forecasted volume of inbound calls as opposed to the current volume of inbound calls and identify an appropriate time when the forecasted volume drops below a threshold amount; (3) the average wait time for inbound calls placed in the hold queue waiting for available agents and identify an appropriate time when the current average wait time drops below a threshold amount of time; (4) the number of available agents and identify an appropriate time when the number of available agents is above a threshold number of agents; (5) the current utilization of agents and identify an appropriate time when the current utilization drops below a threshold amount; or (6) any combination thereof.

Thus, for example, if the contact center is monitoring the average wait time for inbound calls placed in the hold queue waiting for available agents, then the contact center determines whether the current average wait time is below a threshold amount of time in Step 160. If not, then the contact center continues to monitor the system in Step 155. However, if the current average wait time does drop below the threshold amount, then the contact center sends a text message to the calling party in Step 165.

Accordingly, the text message sent to the calling party may contain different information depending on whether the contact center is providing an appropriate time for the calling party to place a subsequent inbound call to the contact center or an appropriate time when the contact center can place an outbound call to the calling party. For instance, if the message is providing the calling party with an appropriate time for the party to place a subsequent inbound call to the contact center then the message may inform the calling party to call back the contact center immediately or within some short period of time while the wait time is low or may provide the calling party with a time window for when the calling party should call back the contact center. For example, if the contact center is monitoring forecasted inbound call volume instead of the current average wait time for calls placed in the hold queue waiting for available agents, then the contact center may determine that the forecasted inbound call volume between 3:00 p.m. and 5:00 p.m. is below a threshold amount. Accordingly, the contact center may send the calling party a text message requesting the party to place a subsequent inbound call to the contact center between the hours of 3:00 p.m. and 5:00 p.m.

In addition, the message may provide the calling party with an option to request another appropriate time to place a subsequent inbound call to the contact center. For instance, if the appropriate time provided in the text message is not a good time for the calling party to place a subsequent call to the contact center, then the text message may inform the calling party to send a return text message requesting a new time. Further, the message may provide the calling party with an option to request a call (e.g., callback) from the contact center instead of placing a subsequent inbound call to the contact center. Again, the text message may inform the calling party to send a return text message requesting a callback. Furthermore, the message may provide the calling party with an option to request via a return text message the current wait time for an available agent.

In these instances, the text message may provide some type of format for each of these different options. For example, the text message may inform the calling party that if he would prefer a callback from the contact center instead of placing a subsequent inbound call to the contact center, then the calling party should send a return text message with the term "callback" in the message. Likewise, the text message may inform the calling party that to request the current wait time for an agent, the calling party should send a return text message with the term "wait time" in the message.

Furthermore, the text message may include a telephone number for the contact center so that the calling party can simply "click" or otherwise select the telephone number to immediately place a subsequent inbound call to the contact center. Depending on the circumstances, the number provided in the text message may be a number for a specific agent so that the calling party is immediately connected with an agent or may be a general number used for inbound calls. In addition, the telephone number provided in the text message may only be valid during the appropriate time identified in the message. While in other embodiments, the text message may include information that the calling party can use to gain a higher priority once the subsequent inbound call has been answered by the contact center. For example, the text message may include a code that the calling party can provide to the IVR so that the subsequent inbound call is given priority over other inbound calls received by the contact center. This can ensure that the calling party is connected with an available agent quickly upon the contact center receiving the subsequent inbound call from the calling party. Again, the code may only be valid during the appropriate time identified in the text message.

For instances in which the initial text message is sent to the calling party to provide an appropriate time for the contact center to place an outbound call (e.g., a callback) to the calling party, the message may indicate that the calling party should reply with a return text message indicating whether the appropriate time in the message is acceptable. For instance, the text message may read "This is Acme technical support, can we call you within the next hour? If so, please respond yes." Accordingly, the calling party may respond with a text message indicating that the contact center can or cannot call the calling party within the next hour. In addition, in particular embodiments, if the calling party is not available during the time provided in the text message, the calling party may include in the return text message a time in which he is available or request another text message at a later time with a new appropriate time for the contact center to place a call to the calling party.

In addition to the above, the contact center may also include additional information in the text message sent to the calling party. For instance, in particular embodiments, the contact center may customize the message based on the reason the calling party initially placed the inbound call to the contact center. Thus, in the example, the contact center may include information on printing cartridges (e.g., advertisements) in the text message sent to the calling party who placed the call about the printer issue. While in another example, if the inbound call was placed by the calling party to make a payment on an account, the text message may include information (e.g., a link) on a website the calling party can visit to make the payment instead of having to place the subsequent inbound call to the contact center or receive an outbound call from the contact center to do so.

It should be noted that although the description provided above indicates different information may be provided in a single text message sent to the calling party, one of ordinary skill in the art should understand that in particular instances the contact center may utilize more than one text message to provide such information. For example, the contact center may send an initial text message to the calling party identifying an appropriate time for the calling party to place an inbound call to the contact center and thereafter (e.g., immediately or a short time after) send the calling party another text message providing the party with the option to request a callback from the contact center instead of placing a call to the contact center. Thus, although the remainder of the description provided in this disclosure describes "a text message" being sent to the calling party, those of ordinary skill in art should understand that multiple text messages may be sent by the contact center to the calling party.

The same should be understood with respect to the return text message sent by the calling party to the contact center. For example, the calling party's device may be limited on the number of characters that can be sent in a single text message from the device. Accordingly, the calling party may send more than one return text message to the contact center in order to reply adequately to the text message received by the calling party from the contact center. Therefore, similar to "a text message" sent by the contact center to the calling party, those of ordinary skill in the art should understand that multiple text messages may be sent by the calling party to the contact center.

Furthermore, the contact center may send out a plurality of text messages at any one time informing a number of different calling parties of an appropriate time to place a subsequent call to the contact center or receive an outbound call from the contact center. In particular embodiments, the number of text messages sent out to the different parties may be based on the monitored parameters. For example, the contact center may send out a first number of text messages if the current average wait time in the hold queue is five minutes and may send out a second, higher number of text messages if the current wait time in the hold queue is only three minutes.

Finally, it should be noted that in instances in which the calling party abandons the inbound call instead of or before the party is provided an option to receive a text message, the contact center may still send the calling party a text message to inform the party of an appropriate time to place a subsequent inbound call to the contact center or receive an outbound call from the contact center. However, in these instances, the contact center may be required to have prior consent from the calling party to send such a text message based on governmental regulations. Thus, in particular embodiments, the contact center may need to determine whether the center has consent from the calling party before sending the text message. In particular instances, the contact center may attempt to obtain such consent initially upon receiving the inbound call from the calling party. For example, the contact center may use the IVR to request such consent. In addition, the contact center may also need to determine if the device used by the calling party is able to receive text messages or whether the center has information on a device for the calling party that is able to receive text messages.

Thus, returning to FIG. 1, depending on the circumstances, the contact center receives a subsequent inbound call from the calling party (e.g., a return call from the calling party) in Step 170 or a return text message from the calling party in Step 180. In instances in which the contact center receives a subsequent inbound call from the calling party, the contact center may treat the call just like a normal inbound call received by the contact center and initially forward the call to the IVR. In turn, the calling party may provide the priority code identified in the text message received by the party to the IVR and accordingly, the IVR may prioritize the subsequent inbound call (return call) in Step 175. Depending on the embodiment, this step may involve different mechanisms such as, for example, placing the subsequent inbound call at the front or near the front of the appropriate hold queue, placing the subsequent inbound call in a "high priority" hold queue that is serviced by the contact center at a higher priority than other hold queues, and/or marking the subsequent inbound call in the hold queue so that the call can be recognized as having a higher priority. Those of ordinary skill in the art can envision other mechanisms that the contact center may use in prioritizing the call in light of this disclosure.

In instances in which the contact center receives a return text message from the calling party, the contact center analyzes the text message to determine the appropriate response to the text message. For instance, the text message may indicate that the appropriate time provided in the text message sent to the calling party to receive an outbound call from the contact center is acceptable. Thus, the contact center may place an outbound call (e.g., a callback) to the calling party at that time in Step 185. In other instances, the text message received from the calling party may request information such as the current average wait time for inbound calls placed in the hold queue waiting for available agents, or may request that another text message be sent at a later time with a new appropriate time identified in the text message, or may request to receive a callback from the contact center. Thus, in these instances, the appropriate response by the contact center is to send another text message to the calling party in Step 165.

As a result of this process, the calling party is typically able to be connected with a contact center agent in a more convenient fashion than had the calling party remained in the hold queue waiting for an available agent for an extended period of time. Thus, the calling party is likely more satisfied with the service received from the contact center then had the calling party been required to continue to wait in the hold queue for an available agent. Further, the process is often advantageous for the contact center because the contact center is able to reduce the number of inbound calls it currently has in a hold queue to service that can be serviced at a later time that is more convenient for the contact center such as, for example, when inbound call volume is lower and/or the number of available agents to service calls is higher.

Exemplary Call Center Architecture

Figure 2:
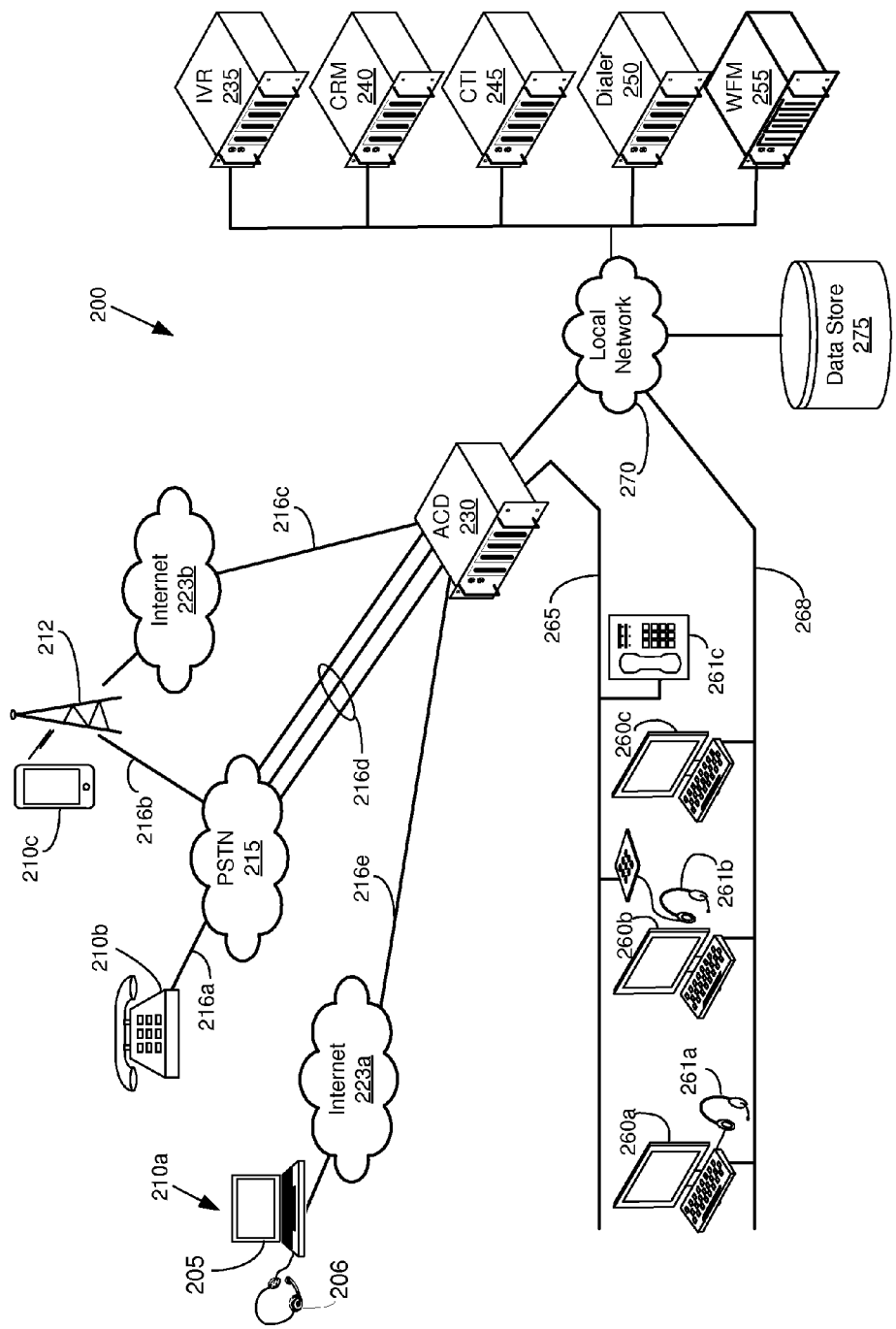
FIG. 2 illustrates one embodiment of a call center architecture that may be used in accordance the various technologies disclosed herein.

FIG. 2 illustrates one embodiment of a call center architecture 200 that may be used in accordance with the various technologies disclosed herein. The call center shown in FIG. 2 may process voice calls that are inbound-only, outbound-only, or a combination of both (sometimes referred to as a "blended" call center). Although many aspects of call center operation are disclosed in the context of voice calls, in various embodiments, the call center may process other forms of communication such as, for example, facsimiles, emails, text messages, video calls, and chat messages. That is, the call center may be considered a contact center. Thus, although a contact center has been referenced above, for the purposes of the remainder of this disclosure, the term "call center" is used throughout, although it is understood that the two are synonymous.

Since the call center may handle calls originating from a calling party, or initiated to a called party, the term "party," without any further qualification, refers to a person associated with a call processed by the call center, where the call is either received from or placed to the party. The term "calling party," if used, will generally refer to a party communicating with the call center, but in many cases this usage is exemplary. Thus, use of the term "calling party" is not intended to limit the concepts to only inbound calls or voice calls, unless the context dictates such.

Depending on the embodiment, inbound voice calls may originate from calling parties using a variety of different phone types. For instance, a calling party may originate a call from a conventional analog telephone 210b connected to a public switched telephone network ("PSTN") 215 using an analog plain old telephone service ("POTS") line 216a. The calls may be routed by the PSTN 215 and may comprise various types of facilities 216d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a mobile phone device 210c, such as a smart phone, tablet, or other mobile device, which wirelessly communicates with a mobile service provider ("MSP") 212. The voice calls may be routed to the PSTN 215 using an integrated services digital network ("ISDN") interface 216b or other types of interfaces that are well known to those skilled in the art. In particular embodiments, the MSP 212 may also route calls as packetized voice, referred to herein as voice-over-IP ("VoIP") to an Internet provider 223b using Internet-based protocols. For convenience, unless indicated otherwise, the term "trunk" refers to any type of facility 216c, 216d, or 216e providing voice calls to, or from, the call center, regardless of the type of protocol or technology used. Specifically, a "trunk" is not limited to time-division multiplexing ("TDM") technology.

Inbound voice calls may also originate from a calling party employing a so-called "IP phone," "VoIP phone," or "soft phone" 210a. In one embodiment, this device may comprise a computing device 205, such as a laptop, computing tablet, or other electronic device, which interfaces with a headphone/microphone combination, also referred to as a "headset" 206. An IP phone may use a digital voice control protocol and may process packetized voice data according to various Internet based voice protocols, such as session initiated protocol ("SIP"). The call may be conveyed by other types of Internet providers 223a, such as a cable company providing Internet access services over a coaxial cable facility 216e. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call originating from any type of device, such as a soft phone 210a, a conventional telephone 210b, a mobile phone 210c, or other device known in the art. The term "call" as used herein may mean an active instance of two-way communication, an attempt to establish two-way communication, or a portion of the two-way communication. For example, a user at a conventional telephone 210b can dial a telephone call in an attempt to establish two-way communication, and a call can be said to exist even prior to establishment of a two-way connection. In another example, a call may be put on hold, and a portion of the call may be referred to as a "call leg" existing between the caller and certain equipment. A call may comprise a number of concatenated call legs, as known to those skilled in the art. In certain contexts, which will be made explicit, the call may encompass communications other than voice, for example, text, email, video chat, facsimile, etc.

In various embodiments, inbound calls from calling parties to the call center may be received at an automatic call distributor ("ACD") 230. In particular embodiments, the ACD 230 may be a specialized switch for receiving and routing inbound calls under various conditions. Further, the ACD 230 may be embodied as a dedicated form of equipment readily available from various manufacturers, or the ACD 230 may be a so-called "soft switch" comprising a suitable programming module executed by a processing device to perform the necessary functions. The ACD 230 may route an incoming call over call center facilities 265 to an available agent. Depending on the embodiment, the facilities 265 may be any suitable technology for conveying the call, including but not limited to a local area network ("LAN"), wide area network ("WAN"), ISDN, or conventional TDM circuits. In addition, the facilities 265 may be the same or different from the facilities used to transport the call to the ACD 230.

In various embodiments, calls may be routed over facilities 265 to an agent for servicing. That is, for example, the party may speak with an agent to receive customer service. The physical area at which the agent sits is often referred to as an agent "position" and these positions are often grouped into clusters managed by a supervisor, who may monitor calls and the agents' productivity. An agent typically uses a computing device 260a-260c, such as a computer, and a voice device 261a-261c. The combination of computing device 260a-260c and voice device 261a-261c may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 261a-261c at the agent's position. Similarly, "routing the call to the agent" means routing a call to the appropriate equipment at an agent's position.

In particular embodiments, the voice device 261a-261c used by an agent may be a soft phone device exemplified by a headset 261a connected to the computer 260a. The soft phone device may be a virtual telephone implemented in part by an application program executing on the computer 260a. Further, the phone may also comprise an Internet Protocol ("IP") based headset 261b or a conventional phone 261c. Use of the term "phone" is intended to encompass all these types of voice devices used by an agent, unless indicated otherwise.

Agents typically log onto their workstations prior to handling calls. This allows the call center to know which agents are available for handling calls. In particular embodiments, the ACD 230 may also maintain data of an agent's skill level that may be used to route a specific call to the agent or group of agents having the same skill level. In particular instances, if a suitable agent is not available to handle a call, the ACD 230 may queue the call for the next available agent. As can be expected, various algorithms may be employed to process calls in an efficient manner.

In various embodiments, two types of signaling information may be provided with an inbound call that may be used by the ACD 230 in processing the call. The first type of signaling information indicates the telephone number dialed by the calling party, and is frequently referred to as "DNIS," derived from the Dialed Number Identification Service associated with this capability. For example, in particular instances, a call center may provide various services, such as sales, customer service, technical support, etc., each of which may be associated with a different telephone number (e.g., multiple toll free "800" numbers). In these instances, the ACD 230 may use the DNIS to determine the purpose of the call, and potentially identify a group of agents having the appropriate skill level to handle the call. Thus, in various embodiments, the ACD 230 may prioritize and route calls to an agent based on the required skill level. Skills-based routing may be a rule-based set of instructions that the ACD 230 uses to handle calls. Depending on the embodiment, skills-based routing may be implemented by the ACD 230, or by the ACD 230 interacting with a computer-telephone integrated ("CTI") server 245.

In various embodiments, the CTI server 245 may be incorporated in the call center architecture 200 to control, monitor, and/or coordinate other components of the architecture 200. Specifically, the CTI server 245 may interact with the ACD 230 to coordinate call processing. Thus, in particular embodiments, the CTI server 245 may control routing of calls from the ACD 230 to the various agent workstations and/or may provide data to other components processing the calls. In addition, in particular embodiments, the CTI server 245 may also monitor various components of the architecture 100. For example, the CTI server 245 may monitor the number of calls received and/or made by the call center and/or monitor performance parameters of agents such as the average handling time of calls for individual agents. Further, the CTI server 245 may also provide call reporting functionality based on data collected during calls.

The second type of signaling information that may be provided with an inbound call is the calling telephone number, often referred to as automatic number identification or "ANI." In particular embodiments, the ACD 230 and/or CTI server 245 may use the ANI of an incoming call to retrieve caller information from a data store 275 and provide the data to an agent's workstation computer 260a-260c over facilities 268 along with routing the call to the agent's workstation phone 261a-261c. Further, in particular embodiments, the ANI may also be used to ascertain a party's status (e.g., a "Gold Level" customer warranting premium service), determine whether consent has been received by a party for particular services or actions, and/or to facilitate the ACD 230 routing the call to a select group of agents. Depending on the embodiment, the data store 275 may include one or more databases storing different information such as, for example, records of caller information. Further, the data store 275 may be integrated with the CTI server 245, the ACD 230, or segregated as a standalone medium or media.

In various embodiments, the ACD 230 may place a call in a queue if there are no suitable agents available, and/or it may route the call to an interactive voice response system (e.g., server) ("IVR") 235 to play voice prompts. In particular embodiments, these prompts may be in a menu type structure and the IVR 235 may collect and analyze responses from the party in the form of dual-tone multiple frequency ("DMTF") tones and/or speech. In addition, the IVR 235 may be used to further identify the purpose of the call, such as, for example, prompting the party to enter account information or otherwise obtain information used to service the call. Further, in particular embodiments, the IVR 235 may interact with other components, such as the CTI server 245 or the data store 275, to retrieve or provide information for processing the call. In other configurations, the IVR 235 may be used to only provide announcements.

Depending on the embodiment, the interaction between the ACD 230, IVR 235, CTI server 245, agent computers 260a-260c, as well as other components, may involve using a local area network ("LAN") 270. However, other configurations are possible, such as, but not limited to, using a wide area network, wireless network, router, bridge, direct point-to-point links, etc.

In particular embodiments, when an agent is interacting with a called or calling party, the agent may use his workstation computer 260a-260c to further interact with other enterprise computing systems, such as, for example, a customer relationship management ("CRM") server 240. A CRM server 240 may be used to integrate information from various enterprise business systems to facilitate the agent servicing the call. In addition, the CRM server 240 may provide a variety of applications.

In addition to receiving inbound communications, including, for example, voice calls, emails, text messages, and facsimiles, the call center may also originate communications to a called party, referred to herein as "outbound" communications. In some embodiments, a call center may employ a dialer 250, such as a predictive dialer, to originate outbound calls at a rate designed to meet various criteria. Similar to the other components within the call center architecture 200, depending on the embodiment, the dialer 250 may comprise one or more software modules executing on a processing device hardware platform.

In various embodiments, the dialer 250 is typically configured to dial a list of telephone numbers to initiate outbound calls, which can be accomplished by instructing the ACD 230 to originate the calls. Thus, in some embodiments, the ACD 230 may include functionality for originating calls, and if so, this functionality may be referred to as a private automatic branch exchange ("PBX" or "PABX"). In other embodiments (not shown), the dialer 250 may directly interface with voice trunks using facilities 216c, 216d, 216e to the PSTN 215 and/or Internet providers 223a, 223b for originating calls.

After the calls are originated, a transfer operation by the ACD 230 (or dialer 250) may connect the call with an agent or a queue, or in some instances the IVR 235. In various embodiments, the dialer 250 may make use of one or more algorithms to determine how and when to dial a list of numbers so as to minimize the likelihood of a called party being placed in a queue while maintaining target agent utilization.

Another component that is employed in the call center architecture 200 shown in FIG. 2 is a workforce management system ("WFM") 255. In various embodiments, the WFM 255 maintains information and generates agents' schedules to effectively handle inbound/outbound communications. For instance, in particular embodiments, the WFM 255 maintains historical call volume information for call campaigns and generates forecasts for expected call volume based on the historical information to predict the number of agents needed to handle the call volume at a defined service level. The WFM 255 then applies the forecasts and information about available agents to generate work rosters of agents (e.g., schedules). That is, the WFM 255 schedules agents for work shifts according to the anticipated needs of the call campaigns. Typically, an agent's work shift includes breaks that represent times during the shift in which the agent is not available to handle calls for the call center. For example, the agent's breaks may include a normal (e.g., scheduled) break from having to handle calls, a lunch break at which time the agent eats lunch, and/or other breaks that involve activities in which the agent is not available to handle calls. For instance, such breaks may include times during the shift in which the agent is at a meeting or is in training.

Although a number of the above components may be referred to as a "server," each may be also referred to in the art as a "computing device," "unit" or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the ACD 230, IVR 235, CRM server 240, CTI server 245, dialer 250, and WFM 255, or other component may be combined into a single hardware platform executing one or more software modules. In addition, the call center architecture 200 may be provided as a hosted solution, where the call processing functionality is provided as a communication service (a so-called "communication-as-a-service" or "CaaS") to a call center operator. Thus, there is no requirement that the servers identified above actually be located or controlled by a call center operator.

In addition, depending on the embodiment, the agent positions may be co-located in a single physical call center or multiple physical call centers. The agents may be remotely located from the other components of the call center, and may also be remotely located from each other, sometimes referred to as a "virtual call center." In particular instances, a virtual call center may describe a scenario in which agents work at home, using their own computers and telephones as workstations. In some configurations, a single physical location of the call center may not be readily identifiable. For instance, this may occur when the call processing functions are provided as a service in a hosted cloud computing environment and the agents positions are in their individual residences.

Those skilled in art will recognize FIG. 2 represents one possible configuration of a call center architecture 200, and that variations are possible with respect to the protocols, facilities, components, technologies, and equipment used. For example, various algorithms and queuing arrangements may be defined to efficiently process and/or place calls.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Receiving Inbound Call Module

Figure 3:
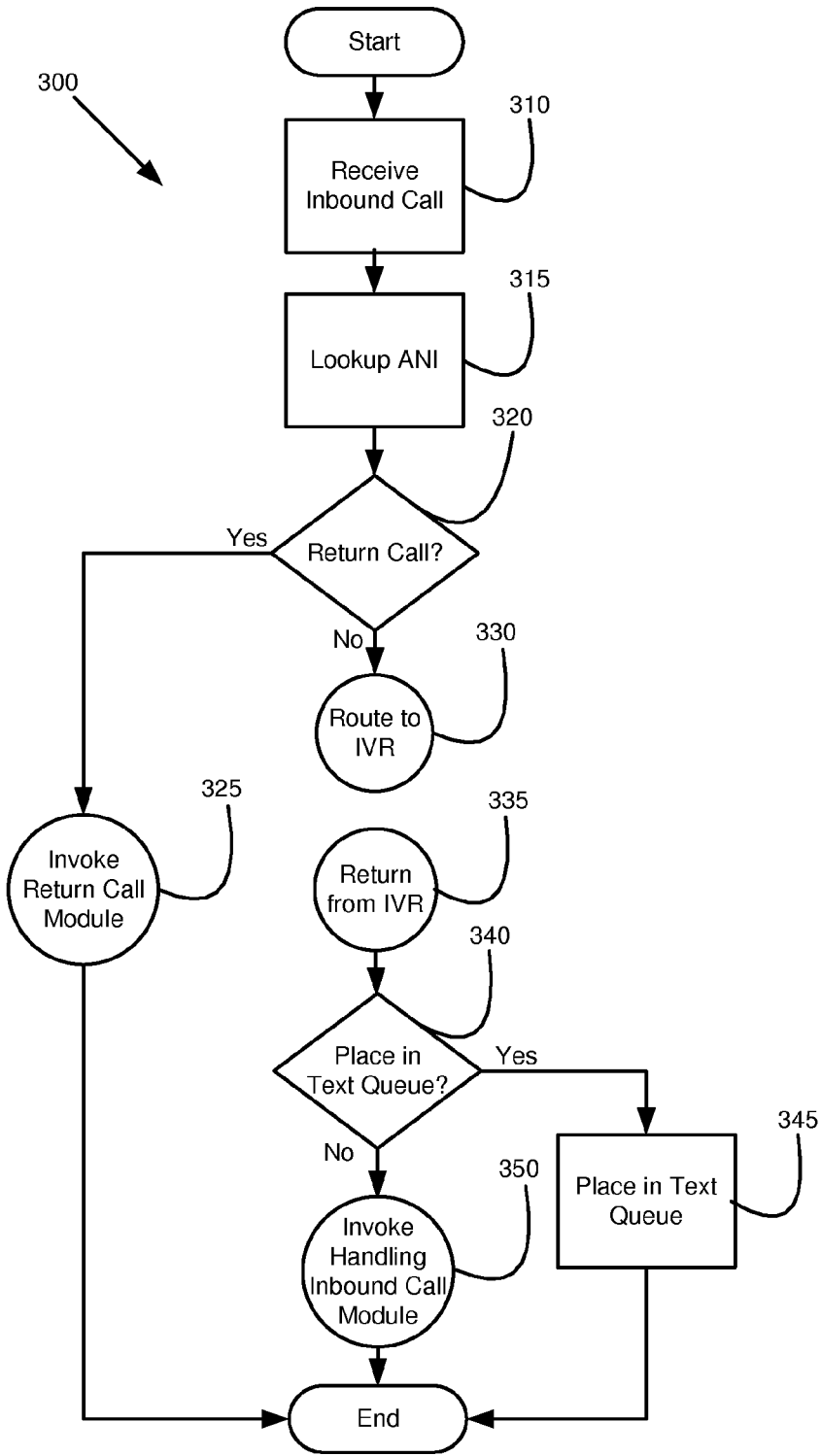
FIG. 3 is a flowchart illustrating a process for receiving an inbound call in accordance with various embodiments of the present invention.

Turning now to FIG. 3, additional details are provided regarding a process flow for receiving an inbound call in accordance with various embodiments of the invention. As mentioned, for purposes of simplicity, the description will focus on the example detailed above involving the calling party placing an inbound call to the call center about an issue the party is having with a new printer. Accordingly, for the purposes of this example, FIG. 3 provides a flow diagram showing a receiving inbound call ("RIC") module for performing such functionality according to various embodiments of the invention. Thus, the flow diagram shown in FIG. 3 may correspond to operations carried out by a processor in a component of the call center architecture 200 such as, for example, the ACD 230 or the CTI server 245, as it executes the RIC module stored in the computing device's volatile and/or nonvolatile memory.

Turning now to FIG. 3, the process 300 begins with the RIC module receiving the inbound call placed by the calling party in Operation 310. At this point, the received inbound call may be a return call (a subsequent inbound call) from a calling party that has received a text message from the call center with respect to an initial inbound call placed to the call center. Thus, in Operation 315, the RIC module looks up the ANI for the received inbound call to see if the ANI is associated with a text message that has been recently sent by the call center to a calling party. For instance, in particular embodiments, the RIC module determines if the ANI for the received inbound call matches a phone number that a text message was sent to within a past time period (e.g., within the last twenty-four hours). If so, then the RIC module determines the inbound call is a return call from a calling party that has received a text message in Operation 320.

However, in some instances, a calling party may not be using the same device to place the inbound call to the call center as the device the calling party received the text message on from the call center. Thus, in particular embodiments, the RIC module may be configured to use the ANI to identify a party associated with the ANI and then determine whether a text message has been sent to the party within a past time period (e.g., within the last twenty-four hours). If so, then the RIC module determines the inbound is a return call from a calling party that has received a text message in Operation 320. As a result of determining the inbound call is a return call, the RIC module invokes a return call module described in more detail in FIG. 6 in Operation 325.

However, if the RIC module determines the inbound call is not a return call, then the RIC module sends the inbound call to an IVR 235 in Operation 330. In turn, the IVR 235 may collect information from the calling party such as the reason why the party has contacted the call center, information that helps to identify the calling party, and/or whether the calling party consents to receiving text messages from the call center. If the calling party consents to receiving text messages, the information may also include a telephone number for a processing device (e.g., a mobile device) the calling party agrees to receive text messages on.

In addition, the IVR 235 may inquire as to whether the calling party would like to receive a text message providing an appropriate time for the calling party to place a subsequent inbound call to the call center or receive a message providing an appropriate time the call center can place an outbound call to the calling party instead of the calling party remaining on hold for an available agent. For instance, in particular embodiments, the IVR 235 may query the call center system for one or more parameters such as the current inbound call volume the call center is experiencing and/or the current average wait time for calls being placed in the hold queue to wait for available agents. Based on this information, the IVR 235 may determine that if the received call were to be placed in the hold queue to wait for an available agent, then the call is likely to remain on hold for an extended period of time. For example, the IVR 235 may be configured to make such a determination if the current average wait time for inbound calls placed in the hold queue is greater than twenty minutes. Accordingly, if the IVR 235 determines the received call is likely to wait in the hold queue for an extended period of time, then the IVR 235 provides the calling party with the option to receive a text message instead of being placed on hold.

Once the IVR 235 has gathered all the required information from the calling party, the IVR 235 returns the call to the RIC module in Operation 335. At this point, the RIC module determines whether to place the inbound call (e.g., an identifier correlated to the inbound call) in the text queue in Operation 340. For instance, in particular embodiments, the IVR 235 passes information to the RIC module when returning the inbound call to the RIC module and this information identifies whether the calling party has agreed to receive a text message instead of being placed on hold to wait for an available agent. If the RIC module determines that the calling party has agreed to receive a text message, then the RIC module places the inbound call in the text queue in Operation 345. At this point, the calling party has hung up on the inbound call and the process carried out by the RIC module for this particular inbound call ends. However, if instead, the RIC module determines the calling party has decided to wait for an available agent, then the RIC module invokes a handling inbound call module in Operation 350 to handle processing the inbound call as described in FIG. 4 below.

Handling Inbound Call Module

Figure 4:
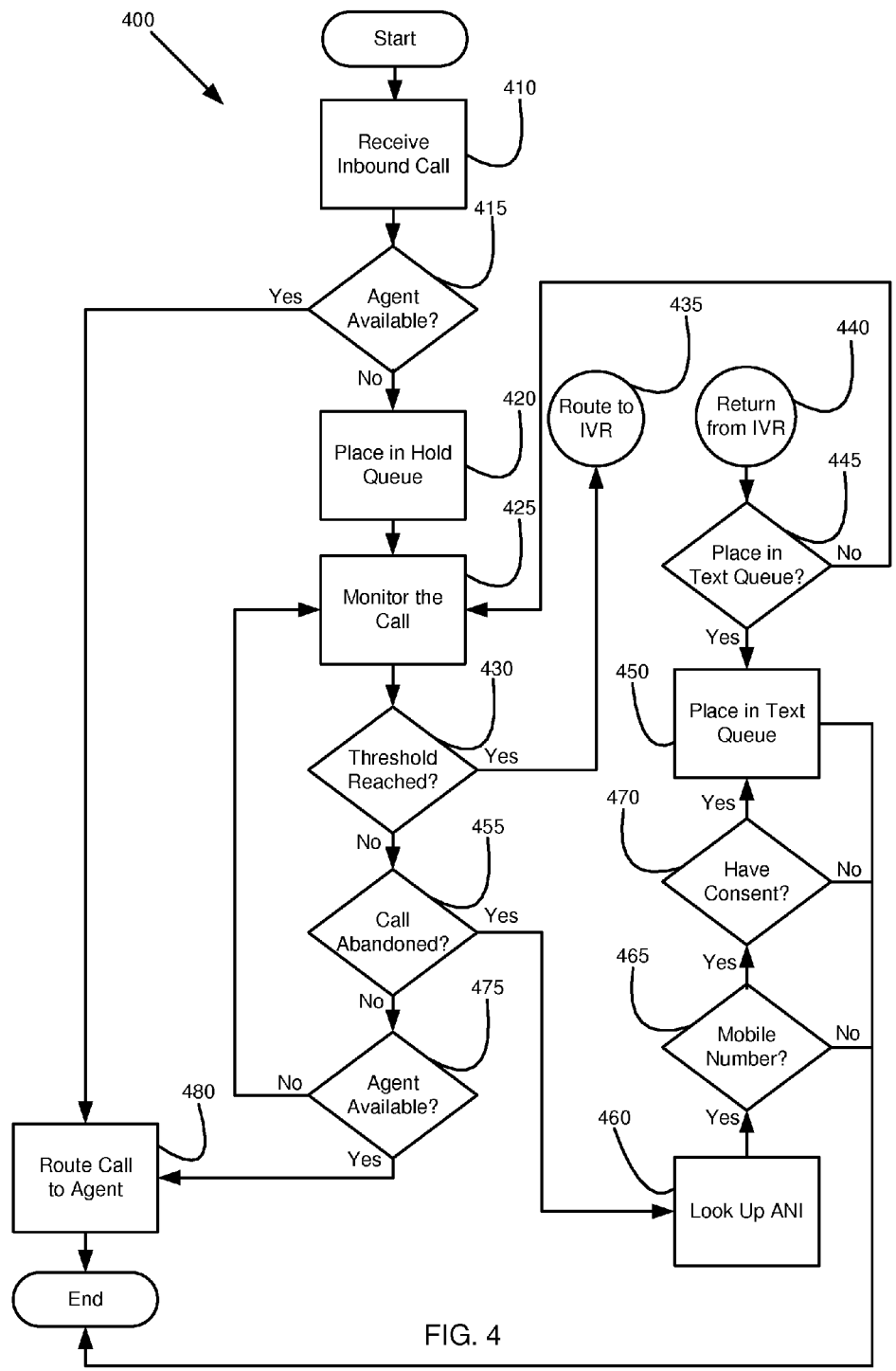
FIG. 4 is a flowchart illustrating a process for handling an inbound call in accordance with various embodiments of the present invention.

Turning now to FIG. 4, additional details are provided regarding a process flow for handling an inbound call in accordance with various embodiments of the invention. Accordingly, FIG. 4 provides a flow diagram showing a handling inbound call ("HIC") module for performing such functionality according to various embodiments of the invention. Thus, the flow diagram shown in FIG. 4 may correspond to operations carried out by a processor in a component of the call center architecture 200 such as, for example, the ACD 230 or the CTI server 245, as it executes the HIC module stored in the computing device's volatile and/or nonvolatile memory.

Turning now to FIG. 4, the process 400 begins with the HIC module receiving the inbound call in Operation 410 from the RIC module. That is to say, the RIC module invokes the HIC module and notifies the module of an inbound call received from the calling party. In turn, the HIC module determines whether an agent is available to handle the call in Operation 415. If so, then the HIC module routes the inbound call to the available agent in Operation 480. However, if an agent is not available, then the HIC module places the inbound call into a hold queue to wait for an available agent in Operation 420.

Accordingly, the HIC module monitors the call once it is placed in the hold queue in Operation 425. Depending on the embodiment, the HIC module may be configured to monitor various aspects with respect to the call. For instance, the HIC module may be configured to monitor the amount of time the call remains in the hold queue, whether the call becomes disconnected with the call center (e.g., whether the calling party hangs up and the call becomes abandoned), and/or the call's progress through the hold queue (position in the hold queue). Further, the HIC module may periodically provide information to the calling party such as estimated remaining wait time in the queue and/or play announcements or music for the calling party as the party waits in the hold queue.

As previously described, in various embodiments, the call center may set threshold values with respect to inbound calls remaining in the hold queue. For instance, in particular embodiments, the call center may set a threshold value of fifteen minutes for a call to remain on hold in the queue. Thus, in Operation 430, the HIC module determines whether the threshold has been reached with respect to the inbound call from the calling party remaining on hold in the queue. Therefore, in the example, if the inbound call received from the calling party has been in the hold queue for sixteen minutes, the HIC module identifies this call as having reached the threshold value of fifteen minutes. Accordingly, the HIC module sends the inbound call to the IVR 235 in Operation 435. That is to say, the HIC module initiates the inbound call placed on hold being routed to the IVR 235.

Depending on the embodiment, the HIC module may be configured to remove the inbound call from the hold queue or maintain the inbound call in the hold queue. That is to say, the HIC module may be configured to remove the placeholder (the identifier) for the inbound call from the hold queue or maintain the placeholder in the hold queue. Once the call has been connected with the IVR 235, the IVR 235 may inquire as to whether the calling party would like to remain on hold for an available agent or whether the calling party would like to receive a text message identifying an appropriate time to place a subsequent inbound call (a return call) to the call center or receive an outbound call (callback) from the call center. Once the calling party has identified his preferred choice, the IVR 235 returns the inbound call to the HIC module.

Accordingly, the HIC module receives the returned inbound call in Operation 440. At this point, the HIC module determines whether to place the inbound call (e.g., an identifier that correlates to the inbound call) in the text queue in Operation 445. That is to say, the HIC module determines whether the calling party has agreed to receive a text message instead of remaining on hold. This determination can be made in a number of different ways. For instance, in one embodiment, the IVR 235 passes information to the HIC module indicating whether the calling party has agreed to receive the text message or whether the calling party would like to remain in the hold queue and wait for an available agent. While in another embodiment, the HIC module accesses information indicating such. Regardless of how the HIC module determines whether to place the call in the text queue, if the module determines the call should be placed in the text queue then the module does so in Operation 450.

It is noted that in various embodiments, placing the inbound call in the text queue does not typically involve actually placing the call in some type of queue or hold. Normally, the inbound call is disconnected with the call center (e.g., the calling party will hang up once he has agreed to receive the text message), the call is removed from the hold queue waiting for an available agent, and an identifier for the call is placed in the text queue. For instance, in particular embodiments, the identifier may be the telephone number of the calling party's device that the text message should be sent to or the identifier may be a tag for a memory location where contact information for the calling party is stored. At this point, the identifier remains in the text queue until the call center determines a text message should be sent to the calling party.

As previously mentioned, there may be instances in which an inbound call has been placed in the hold queue waiting for an available agent and the calling party becomes impatient or frustrated for remaining on hold and decides to hang up. In many of these instances, the call center may simply have lost an opportunity to converse with the calling party and this can be detrimental to the call center. For example, if the calling party had placed the inbound call to the call center to place an order for a product then the call center may have lost an opportunity to make a sale. Thus, in many instances, it may be advantageous for the call center to attempt to contact a calling party that was placed on hold waiting for an available agent but became impatient and hung up, thus abandoning the call.

Accordingly, returning to Operation 430, the HIC module may determine that the threshold has not been reached with respect to the inbound call remaining in the hold queue. At this point, the HIC module determines whether the call has been dropped (e.g., abandoned) in Operation 455. If not, then the HIC module determines whether an agent is available to handle the call in Operation 475 and if so, the HIC module routes the call to the available agent in Operation 480. However, if instead the HIC module determines the call has been dropped in Operation 455, then the HIC module looks up the ANI for the call in Operation 460.

Generally speaking, this operation is carried out by the HIC module to determine whether the inbound call placed by the calling party was made by a device having a capability to receive text messages. That is to say, in various embodiments, this operation is carried out by the HIC module to determine whether the inbound call was made by a mobile device such as a mobile phone or smart phone that has the capability to receive text messages. In particular embodiments, the HIC module may carry out this operation by looking up the ANI of the inbound call in an external database listing known phone numbers for mobile devices. While in other embodiments, the HIC module may carry out this operation by using the ANI of the inbound call to retrieve caller information from a data store 275 within the call center to confirm the inbound call was placed by a mobile device.

In some instances, the calling party may have placed the inbound call to the call center using a device that does not have a capability to receive text messages. For instance, the calling party may have placed the inbound call from his landline home phone. However, the calling party may also have a mobile device that can receive text messages. Thus, in these instances, the HIC module may determine the ANI is not associated with a device that can receive text messages. However, the module may retrieve caller information on the calling party using the ANI and the caller information may identify a phone number for the calling party's mobile device that can receive text messages.

At this point, the HIC module determines whether the call center has a phone number for a device of the calling party that can receive text messages in Operation 465. If so, then the HIC module determines whether the call center has consent from the calling party to send the device a text message in Operation 470. As previously mentioned, the calling party may have previously provided the call center with consent (permission) to send text messages to the calling party's mobile device. For instance, upon receiving the inbound call from the calling party, the call center may have initially routed the call to an IVR 235 to gather information from the calling party on why the party has called the call center. At this time, the IVR 235 may inquire as to whether the call center has permission to send the calling party text messages. If the calling party provides consent to send text messages, the IVR 235 may also solicit information (e.g., telephone number) on the device the call center should send the text messages to.

In another instance, the calling party and call center may have an established relationship prior to the calling party placing the inbound call to the call center. For example, the call center may be fielding inbound calls for a credit card company. At the time the calling party signed up for a credit card account, the credit card company may have obtained consent from the calling party to send text messages to the party. Again, the credit card company may have also gathered information from the calling party on the device that such messages should be sent to.

Thus, in Operation 470, if the HIC module determines that the calling party has provided consent for sending the party text messages, then the HIC module places the call in the text queue in Operation 450. At this point, the call remains in the text queue until the call center determines a text message should be sent to the calling party identifying an appropriate time that the calling party should place a subsequent inbound call to the call center or an appropriate time that the call center can place an outbound call to the calling party.

Monitoring Module

Figure 5:
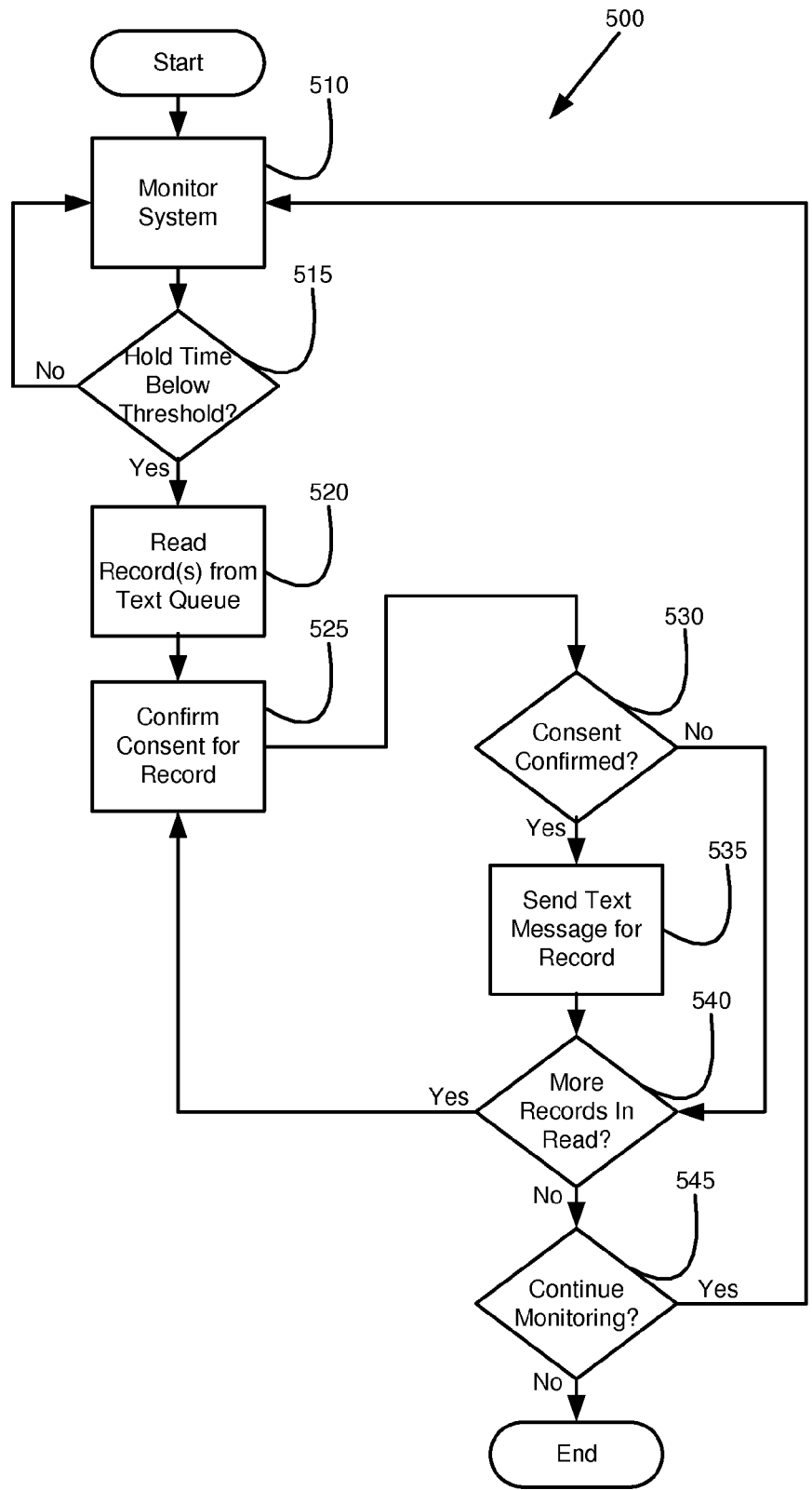
FIG. 5 is a flowchart illustrating a process for sending a callback text message in accordance with various embodiments of the present invention.

Turning now to FIG. 5, additional details are provided regarding a process flow for send a callback text message to a calling party in accordance with various embodiments of the invention. Accordingly, FIG. 5 provides a flow diagram showing a monitoring module for performing such functionality according to various embodiments of the invention. Thus, the flow diagram shown in FIG. 5 may correspond to operations carried out by a processor in a component of the call center architecture 200 such as, for example, the ACD 230 or the CTI server 245, as it executes the monitoring module stored in the computing device's volatile and/or nonvolatile memory.

Returning briefly to the example in which the calling party placed the initial inbound call to the call center about the printer issue, the calling party was placed on hold to wait for an available agent and decided to receive a text message from the call center providing an appropriate time to place a subsequent inbound call to the call center or received an outbound call from the call center instead of remaining on hold. Consequently, the inbound call (e.g., an identifier for the call) was placed in the text queue.

Thus, turning to FIG. 5, the process 500 begins with the monitoring module monitoring the call center system in Operation 510. As previously mentioned, in various embodiments, the call center (e.g., the monitoring module) monitors one or more parameters of the call center system to determine when an appropriate time occurs for the calling party to place a subsequent inbound call to the call center or for the call center to place an outbound call to the calling party. For instance, depending on the embodiment, the monitoring module may monitor: (1) the current volume of inbound calls the center is handling and identify an appropriate time when the volume drops below a threshold amount; (2) a forecasted volume of inbound calls as opposed to the current volume of inbound calls and identify an appropriate time when the forecasted volume drops below a threshold amount; (3) the average wait time for inbound calls placed in the hold queue waiting for available agents and identify an appropriate time when the current average wait time drops below a threshold amount of time; (4) the number of available agents and identify an appropriate time when the number of available agents is above a threshold number of agents; (5) the current utilization of agents and identify an appropriate time when the current utilization drops below a threshold amount; or (6) any combination thereof.

However, for purposes of explaining this process flow, the monitoring module has been configured to monitor the average wait time for inbound calls placed in the hold queue waiting for available agents. Therefore, the monitoring module determines whether the current average wait time for inbound calls placed in the hold queue is below a threshold amount of time in Operation 515. For instance, the threshold may be set at five minutes and the monitoring module determines whether the current average wait time for inbound calls placed in the hold queue is less than five minutes.

If the current average wait time is not below five minutes, the monitoring module continues to monitoring the average wait time. Depending on the embodiment, this may involve configuring the monitoring module to check the average wait time at particular time intervals such as, for example, every two minutes, ten minutes, or thirty minutes. However, if the monitoring module determines the current average wait time is below the threshold, then the monitoring module reads one or more records from the text queue in Operation 520.

As previously mentioned, the text queue may comprise identifiers and associated information for prior inbound calls in which the calling parties had decided to receive text messages instead of remaining in the hold queue waiting for available agents. (The text queue may also include identifiers and associated information for inbound calls that were abandoned while on hold that did not expressly request to be placed in the text queue.) Thus, an identifier and associated information for a particular inbound call may be considered a record in the text queue. Like the hold queue for available agents, the text queue may be configured to order the records many different ways according to embodiments. For instance, the text queue may be structured under a FIFO-type configuration in which the first records placed in the queue are the first records read from the queue. However, in other embodiments, records may be placed in the text queue based on priority and/or marked accordingly based on priority, or the text queue may comprise multiple queues of distinct categories.

Further, the monitoring module may be configured to read a number of records from the text queue based on the monitored parameters with respect to the thresholds. For instance, returning to the example in which the monitoring module is monitoring the average wait time of inbound calls placed in the hold queue waiting for available agents and the threshold has been set to five minutes. The monitoring module may be configured to read fifty records from the text queue if the average wait time is currently three or four minutes and to read seventy-five records from the text queue if the average wait time is currently below three minutes.

Regardless of how many records the monitoring module reads, the module confirms that consent has been obtained from the calling party for a first record read from the text queue in Operation 525. Although this particular operation may not be carried out in every embodiment, including this operation may serve as a "double" check to ensure that the call center has obtained the required consent to send the calling party a text message before actually sending the text message to the calling party and thus, minimizing exposure to potential liability for the call center.

For example, an entity (e.g., a credit card company) may have originally obtained consent from a calling party to send text messages to the calling party's mobile device at a time when the calling party was setting up an account with the entity. Accordingly, the calling party places an inbound call to a call center fielding calls for the entity and is initially routed to an IVR 235 at which time the calling party revokes the consent for receiving text messages. The calling party is then placed in a hold queue waiting for an available agent, becomes impatient, and hangs up on the call. Accordingly, the call center may place the call received from the party into the text queue based on the original consent received from the calling party. That is to say, the call center may not have updated its system in time to reflect the calling party's revocation of consent before placing the inbound call received from the party into the text queue. Therefore, including an operation in which the monitoring module confirms consent has been received from the calling party and is current can help the call center to avoid exposure to potential liability for sending an errant text message to the calling party in this example.

Thus, in Operation 530, the monitoring module confirms consent has been provided by the calling party for receiving a text message. If so, then the monitoring module sends a text message to the calling party's device configured to receive such messages in Operation 535. In general, the text message identifies an appropriate time the calling party should place a subsequent inbound call to the call center or an appropriate time the call center can place an outbound call to the calling party.

However, as previously described, the text message may include additional information depending on the circumstances. For instance, when the text message provides an appropriate time for the call center to place an outbound call (e.g., a callback) to the calling party, the message may request the calling party to reply with a return text message indicating whether the appropriate time in the message is acceptable. In addition, the message may provide the calling party with an option to request another appropriate time to place a subsequent inbound call to the call center or to receive an outbound call from the call center. Further, the message may provide the calling party with an option to request a call (e.g., callback) from the call center instead of placing a subsequent inbound call to the call center and/or provide the calling party with an option to request the current wait time for an available agent. While further, the text message may provide a telephone number for the call center configured so that the calling party can simply "click" on the telephone number to immediately place a subsequent inbound call to the call center and/or provide information the calling party can use to gain a higher priority once the subsequent inbound call has been answered by the call center.

Furthermore, the message content may be based on the reason the calling party initially placed the inbound call to the call center. For example, the call center may include information on printing cartridges (e.g., advertisements) in the text message sent to the calling party who placed a call to the call center about a printer issue. While in another example, if the inbound call was placed by the calling party to make a payment on an account, the text message may include information (e.g., a link) on a website the calling party can visit to make the payment instead of having to place the subsequent inbound call to the call center or receive an outbound call from the call center to do so.

Thus, returning to FIG. 5, at this point, the monitoring module determines whether more records have been read from the text queue in Operation 540. If so, then the monitoring module returns to Operation 525 and confirms consent has been received for the next record read from the text queue. If all of the records read from the text queue have been processed, then the monitoring module determines whether to continue to monitor the one or more parameters for the call center in Operation 545. For instance, call center operators may decide to stop the monitoring module so that no other text messages are sent out for records in the text queue or to stop the monitoring module because no other records are currently in the text queue. Thus, the monitoring module confirms that it should continue to monitor the one or more parameters for the call center and send out text messages accordingly in Operation 545.

As a result of this process 500, calling parties receive text messages from the call center identifying appropriate times the parties should place subsequent inbound calls to the call center or appropriate times the call center can place outbound calls to the calling parties. Generally speaking, in various embodiments, the appropriate times are times identified by the call center when it may be advantage to both the call center and the parties for the parties to place subsequent inbound calls to the call center or the call center to place outbound calls to the calling parties. For instance, the call center may be currently experiencing a low volume of inbound calls and thus, if the parties place subsequent inbound calls to the call center, these parties are more likely to reach available agents and be serviced quickly. Likewise, if the call center placed outbound calls to calling parties during this time, then the call center is more likely to have agents available who can place such calls and service the calls quickly.

Further, sending callback text messages to the calling parties instead of simply placing callback telephone calls to these parties may also be advantageous to both the call center and calling parties because the parties generally have opportunities to respond to the text messages when it is convenient for the calling parties and likely appropriate for the call center to handle such calls. For example, if the call center simply placed a callback call to a calling party, then the calling party may not be available at the time the call is placed or it may not be a convenient time for the calling party to receive a call. Thus, sending the calling party a callback text message identifying an appropriate time for the party to place a subsequent inbound call to the call center or for the call center to place an outbound call to the party provides the calling party an opportunity to identify times when it is both convenient for the calling party and for the call center to effectively handle such a call.

Return Call Module

Figure 6:
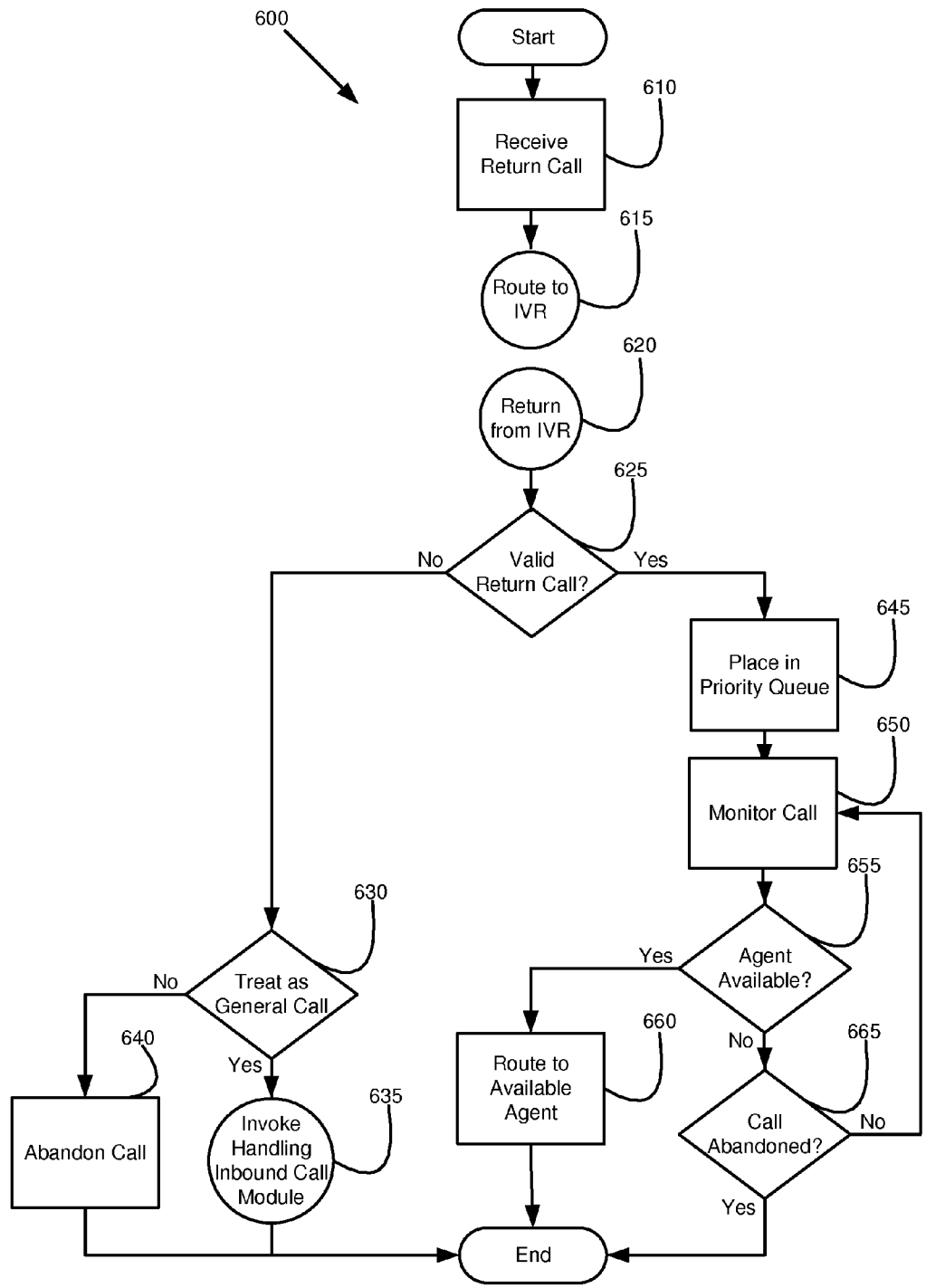
FIG. 6 is a flowchart illustrating a process for handling a return call in accordance with various embodiments of the present invention.

Turning now to FIG. 6, additional details are provided regarding a process flow for handling a return call in accordance with various embodiments of the invention. Accordingly, FIG. 6 provides a flow diagram showing a return call module for performing such functionality according to various embodiments of the invention. Thus, the flow diagram shown in FIG. 6 may correspond to operations carried out by a processor in a component of the call center architecture 200 such as, for example, the ACD 230 or the CTI server 245, as it executes the return call module stored in the computing device's volatile and/or nonvolatile memory.

As previously discussed, when the call center receives an inbound call, the call is initially processed by the RIC module. The RIC module determines from the ANI of the inbound call whether the call is a return call from a calling party that was sent a text message and if so invokes the return call module and sends the inbound call to the module. Accordingly, the process 600 begins with the return call module receiving the return call in Operation 610.

At this point, the return call module routes the call to the IVR 235 in Operation 615. In turn, the IVR 235 inquires from the calling party about the circumstances under which the calling party placed the return call to the call center. For instance, the IVR 235 may request the calling party to enter an appropriate code to validate the return call and/or to provide the return call with priority over other inbound calls received by the call center. Thus, the calling party enters the appropriate code and the IVR 235 may determine from the code that the return call was placed during the appropriate time provided in the text message sent to the calling party.

For example, the text message sent to the calling party may indicate that the party should place a return call to the call center between the hours of 3:00 p.m. and 5:00 p.m. and provide a validation code of 12345. Accordingly, the IVR 235 requests the calling party to enter the validation code by speaking the code or typing the code on the keypad of the calling party's phone device and the calling party does so. The IVR 235 then confirms the validity of the code and that the return call placed to the call center was done so within the calling window provided in the text message sent to the calling party. That is to say, the IVR 235 determines whether the return call was placed to the call center between the hours of 3:00 p.m. and 5:00 p.m. in this instance. If not, then the IVR 235 informs the calling party that the return call cannot be validated and inquires as to whether the calling party, regardless, would like to be placed on hold to wait for an available agent. (In particular embodiments, the IVR 235 may also ask the calling party to re-enter the code upon receiving an "invalid" code to ensure that the calling party has not entered a typographical error for the code.) The calling party indicates whether he would or would not like to remain on hold and at this point, the IVR 235 returns the call to the return call module in Operation 620 along with the result of validating the call. In other instances, in which the IVR 235 does confirm the validity of the return call, the IVR 235 does the same.

Thus, in Operation 625, the return call module determines whether the return call received from the calling party is valid or not. If not, then the return call module determines whether to treat the call as a "general" inbound call received by the call center in Operation 630. Therefore, in this instance, if the return call was found by the IVR 235 to be invalid and the calling party decided to remain on hold for an available agent anyway, then the return call module determines the call is to be treated as a "general" inbound call received by the call center and invokes the HIC module in Operation 635 to handle the call. However, if the calling party decided not to remain on hold for an available agent and hangs up, then the return call module abandons the call in Operation 640.

Returning to Operation 625, if instead the return call module determines the return call is valid, then the return call module places the call in a priority queue in Operation 645. As previously described, the call center may utilize a priority queue in particular embodiments in which calls placed in the priority queue are given higher priority over other inbound calls received by the call center. Thus, the calls placed in the priority queue are typically serviced by available agents more quickly than general inbound calls placed in a hold queue. In other embodiments, the return call module may place the return call in the same hold queue as other general inbound calls however the module may identify the return call (e.g., "mark" the call with an identifier) as having a higher priority over other calls placed in the queue. Those of ordinary skill in the art can envision other mechanisms that may be used in prioritizing the call over other inbound calls received by the call center in light of this disclosure.

At this point, the return call module monitors the call as the call waits in the priority queue in Operation 650. At periodic intervals, the return call module determines whether an agent is available to service the call in Operation 655. For instance, in one embodiment, the return call module may be configured to determine every fifteen seconds whether an agent has become available to handle a call placed in the priority queue. While in another embodiment, the return call module may be configured to receive a trigger from a component within the call center architecture 200 that signals an agent is available to handle a call in the priority queue.

For example, the ACD 230 or the CTI server 245 may be configured to monitor when agents become available to handle another call and to notify the HIC module and the return call module as agents become available accordingly. In this instance, the ACD 230 or the CTI server 245 may be configured to systematically send such notifications to the HIC module and the return call module based on the number of calls currently in the hold queue serviced by the HIC module and the priority queue serviced by the return call module. At any given time, the number of calls in the priority queue may be roughly the same, more, or less than the number of calls in the hold queue. If the number of calls is more in the priority queue or roughly the same for both queues, then the ACD 230 or the CTI server 245 may be configured to send two notifications to the return call module for every one notification sent to the HIC module. Such a configuration can help to ensure calls placed in the priority queue are processed more quickly than calls placed in the hold queue. However, if the number of calls in the priority queue is less than the number of calls in the hold queue, then the ACD 230 or the CTI server 245 may be configured to send one notification to the return call module for every one notification sent to the HIC module. Depending on the embodiment, the call center may set up this configuration based on a specific number of calls being less in the priority queue such as fifty percent less, twenty-five percent less, ten percent less, etc.

Thus, returning to FIG. 6, if the return call module determines an agent is available to handle the return call, then the module routes the return call to the available agent in Operation 660. Again, as previously mentioned, this operation typically involves the return call module taking the return call off of hold and routing the call to the available agent. In addition, the return call module removes the call (e.g., the call identifier) from the priority queue.

However, if the return call module determines an agent is not available to handle the return call, then the module determines whether the call has become abandoned in Operation 665. That is to say, the calling party may become impatient while waiting for an available agent in the priority queue and hangs up and abandons the calls. If the call has not been abandoned, then the return call module returns to Operation 650 and continues to monitor the call.

Return Text Message Module

Figure 7:
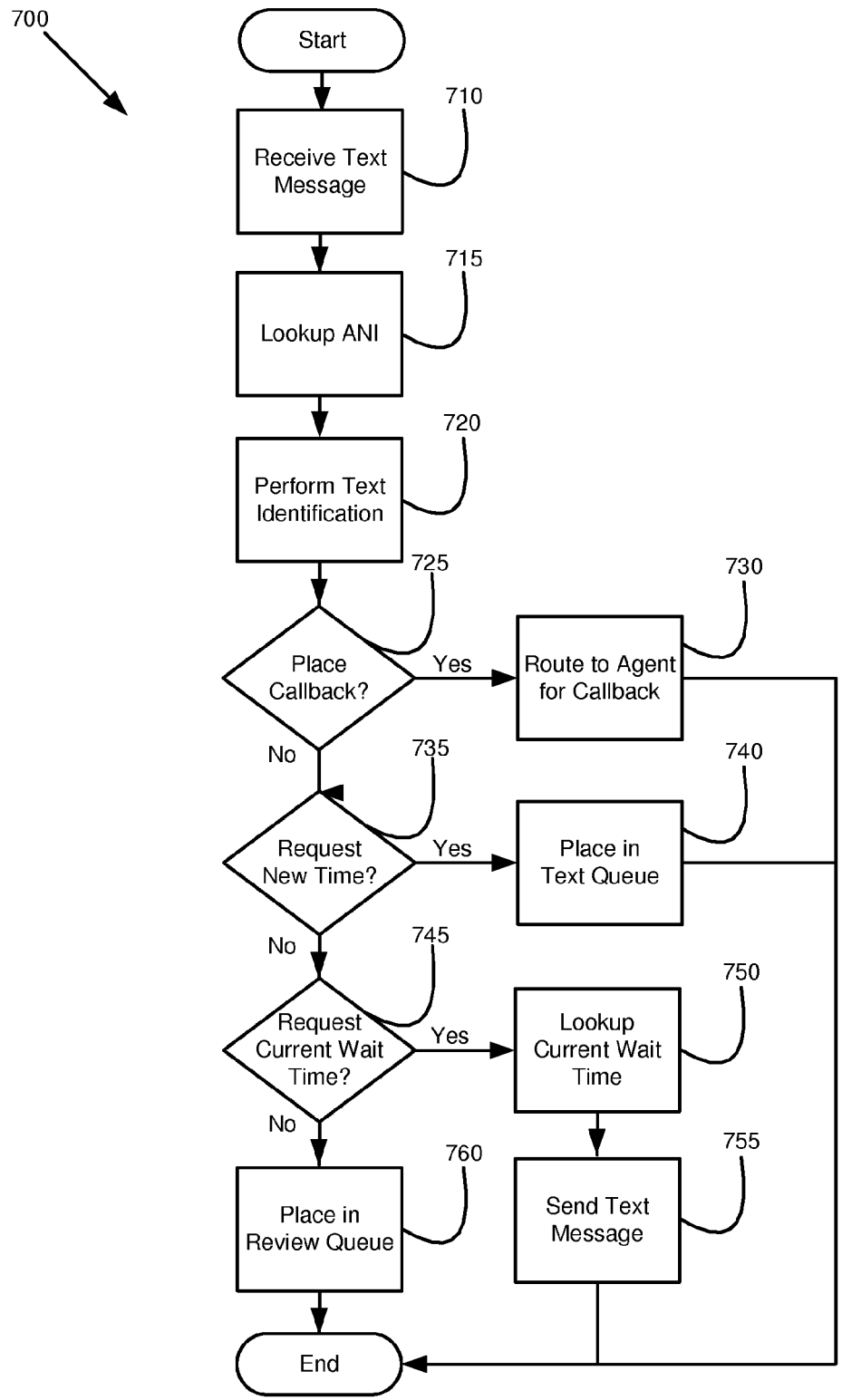
FIG. 7 is a flowchart illustrating a process for handling a return text message in accordance with various embodiments of the present invention.

As previously mentioned, a calling party may respond to a text message received from the call center by sending the call center a return text message. Thus, turning now to FIG. 7, additional details are provided regarding a process flow for handling a return text message in accordance with various embodiments of the invention. Accordingly, FIG. 7 provides a flow diagram showing a return text message module for performing such functionality according to various embodiments of the invention. Thus, the flow diagram shown in FIG. 7 may correspond to operations carried out by a processor in a component of the call center architecture 200 such as, for example, the ACD 230 or the CTI server 245, as it executes the return text message module stored in the computing device's volatile and/or nonvolatile memory.

Accordingly, the calling party receives a text message from the call center and responds to the text message by returning a text message to the same phone number that the text message from the call center was received from. As a result, in particular embodiments, the ACD 230 is configured to receive and recognize the text message sent from the calling party and forward the message to the return text message module. In other embodiments, a gateway or other interface that is separate from the ACD 230 may be used to receive the text message sent from the calling party. Thus, the process 700 begins in FIG. 7 with the return text message module receiving the text message in Operation 710.

At this point, the return text message module looks up the ANI for the text message to determine the calling party the text message was received from in Operation 715. In addition, in particular embodiments, the return text message module may also determine what text message was sent to the calling party. For instance, the return text message module may look up the phone numbers for which text messages were sent to by the call center in a past time period, such as twenty-four hours, using the ANI of the received text message. Once a matching phone number is located, the return text message module determines the calling party that the text message was sent to and the content of the message that was sent.

Upon identifying the calling party and the message that was sent to the calling party, the return text message module next performs text identification on the return text message received from the calling party in Operation 720. For instance, in particular embodiments, the return text message module performs text recognition on the return text message received from the calling party to determine the content of the message. This operation may entail the return text message module making use of some type of text recognition software such as optical character recognition (OCR) software for example. Thus, in particular embodiments, the return text message module may be configured to identify key words and/or phrases in the return text message received from the calling party to help identify the content of the text message.

As previously mentioned, the call center may provide the calling party with options in the text message sent to the calling party and the calling party may exercise these options by sending a return text message to the call center. For instance, if the call center would like to place an outbound call to the calling party, then the calling party may be asked in the text message if a call can be placed to the party "in the next ten minutes," "in the next hour," or may identify a specific time window such as 3:00 p.m. to 5:00 p.m. In addition, the text message may request the calling party to return a text message indicating whether a call can be placed during the identified time window by answering "yes" or "no." In another instance, the calling party may be provided the option to request a call from the call center by replying to the text message with a return text message stating "callback" or "return call." While in another instance, the calling party may be provided the option to request the current wait time for an available agent by replying to the text message with a return text message stating "wait time" or "queue time."

Thus, by knowing the content and context of the text message sent to the calling party, the return text message module may perform text identification on the return text message received from the calling party to look for certain key words and/or phrases in light of the text message sent to the calling party. For example, if the text message sent to the calling party provided the calling party with the option to request a new (later) time to place a subsequent inbound call to the call center by sending a return text message with the key words "new time" in the message, then the return text message module would perform text identification on the return text message to identify if the key words "new time" were in the message.

Therefore, returning to FIG. 7, the return text message module first determines in Operation 725 whether to place a callback to the calling party based on the text identification performed on the return text message. For example, the text message sent to the calling party may have indicated that a return text message with the key works "return call" and/or "callback" in the message should be sent if the calling party would like to receive a call from the call center. Accordingly, the return text message module would determine whether the return text message contains the words "return call" and/or "callback" or not. If the return text message module determines the return text message does contain the words "return call" and/or "callback," then the module routes information on the calling party to an available agent (or hold queue for the available agent) in Operation 730 so that the agent can place the outbound call to the calling party.

Likewise, the return text message module determines whether the calling party has requested a new time to place a subsequent inbound call to the call center or receive an outbound call from the call center in Operation 735. For instance, in particular embodiments, the return text message module may determine whether the content of the return text message received from the calling party contains the key words "new time" (or some similar phrase indicating the party is requesting a new time). If so, then the return text message module places the call (e.g., the calling party) into the text queue in Operation 740 so that a new time can be sent to the calling party in another text message from the call center at a later time.

Furthermore, the return text message module determines whether the calling party is requesting the current wait time for an available agent in Operation 745. Again, the calling party may be instructed by the text message received from the call center to send a return text message to the call center with the key words "wait time" in the body of the message. Thus, if the return text message module determines the calling party is requesting the current wait time, then the return text message module looks up the current wait time in Operation 750 and sends the time in another text message to the calling party in Operation 755.

Finally, if the return text message module determines that the content of the return text message received from the calling party does not request a callback, a new time, or the current wait time for an available agent, then the return text message module may place the return text message in a review queue so that the message can be manually reviewed by an agent in Operation 760. Thus, the return text message is later read by an agent and handle accordingly.

Exemplary Processing Device Architecture

Figure 8:
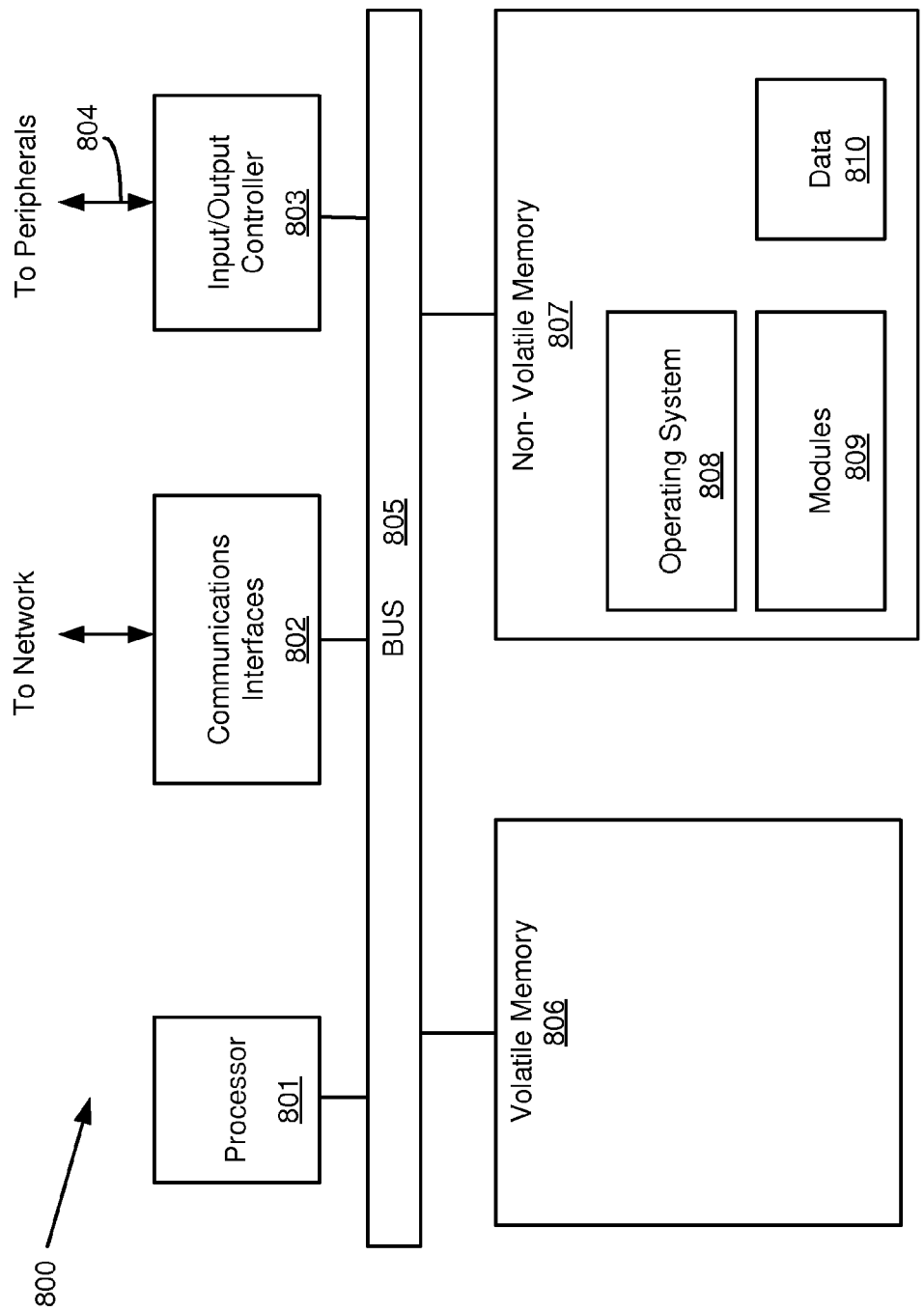
FIG. 8 is an exemplary schematic diagram of a system used in one embodiment of the call center architecture to practice the technologies disclosed herein.

As discussed in conjunction with FIG. 2, the call center architecture 200 may comprise various components that comprise a processing system. FIG. 8 is an exemplary schematic diagram of a processing system 800 that may be used in an embodiment of the call center architecture 200 to practice the technologies disclosed herein such as, for example, the ACD 230, IVR 235, CRM server 240, CTI server 245, dialer 250, WFM 255, agents' computing device 260a-160c, or other component previously described. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 8, the processing system 800 may include one or more processors 801 that may communicate with other elements within the processing system 800 via a bus 805. The processor 801 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 800 may also include one or more communications interfaces 802 for communicating data via the local network with various external devices, such as other components of FIG. 2. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 803 may also communicate with one or more input devices or peripherals using an interface 804, such as, but not limited to: a keyboard, a mouse, a touch screen/display input, microphone, pointing device, etc. The input/output controller 803 may also communicate with output devices or peripherals, such as displays, printers, speakers, headsets, banner displays, etc.

The processor 801 may be configured to execute instructions stored in volatile memory 806, non-volatile memory 807, or other forms of computer-readable storage media accessible to the processor 801. The volatile memory 806 may comprise various types of memory technologies, including, but not limited to: random access memory ("RAM"), dynamic random access memory ("DRAM"), static random access memory ("SRAM"), and other forms well known to those skilled in the art. The non-volatile memory 807 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 807 may store program code and data, which also may be loaded into the volatile memory 806 at execution time. Specifically, the non-volatile memory 807 may store one or more computer program modules 809, such as, for example, the RIC module, the HIC module, the monitoring module, the return call module, and/or the return text message module described above, and/or operating system code 808 containing instructions for performing the process and/or functions associated with the technologies disclosed herein. In addition, the modules 809 may also access, generate, or store data 810 (such as, for example, information on the inbound calls placed in the various queues) in the non-volatile memory 807, as well as in the volatile memory 806. The volatile memory 806 and/or non-volatile memory 807 may be used to store other information including, but not limited to: records, applications, programs, scripts, source code, object code, byte code, compiled code, interpreted code, machine code, executable instructions, or the like. These may be executed or processed by, for example, the processor 801. These may form a part of, or may interact with, the modules 809.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for providing a callback text message to a party who has placed an inbound call received by a contact center comprising:
    placing an identifier for the inbound call into a queue to wait for an available agent for the contact center who can service the inbound call;
    after placing the identifier for the inbound call into the queue, detecting a condition by one or more computer processors, the condition comprising at least one of the identifier for the inbound call remaining in the queue for at least a minimum amount of time, the identifier for the inbound call expected to remain in the queue for at least a minimum amount of time, and the inbound call becoming disconnected with the contact center;
    monitoring one or more parameters associated with inbound calls received by the contact center by the one or more computer processors; and
    after detecting the condition and before the available agent services the inbound call:
        removing the identifier for the inbound call from the queue so that the available agent is no longer required to service the inbound call; and upon the one or more parameters reaching one or more threshold values, sending a text message to a processing device associated with the party who placed the inbound call, the text message comprising priority information that can be used upon placing a subsequent inbound call to the contact center to facilitate the contact center prioritizing the subsequent inbound call over at least one other inbound call received by the contact center.

2. The method of claim 1, wherein the one or more parameters comprise at least one of a number of agents currently available to handle inbound calls, an average wait time for inbound calls placed in the queue, a total number of calls currently in the queue, a number of agents scheduled to begin work, and a volume of inbound calls forecasted to be received by the contact center for a future period of time.

3. The method of claim 1, wherein the text message further comprises a phone number configured to be selected by the party to originate the subsequent inbound call by the processing device to the contact center.

4. The method of claim 1 further comprising verifying the party has provided consent to receiving the text message on the processing device prior to sending the text message to the processing device.

5. The method of claim 1 further comprising providing an appropriate time in the text message during which the party should place the subsequent inbound call to the contact center.

6. The method of claim 1 further comprising:
receiving the subsequent inbound call from the party;
requesting the priority information from the party by an interactive voice response system; and
upon receiving the priority information from the party, placing an identifier for the subsequent inbound call into the queue at a position having a higher priority than the at least one other inbound call received by the contact center.

7. The method of claim 1, wherein the text message further comprises a time period in which the party should place the subsequent inbound call to the contact.

8. A non-transitory, computer-readable medium comprising computer-executable instructions for providing a callback text message to a party who has placed an inbound call received by a contact center, the computer-executable instructions configured when executed to cause at least one computer processor to:
place an identifier for the inbound call into a queue to wait for an available agent for the contact center who can service the inbound call;
after placing the identifier for the inbound call into the queue, detect a condition comprising at least one of the identifier for the inbound call remaining in the queue for at least a minimum amount of time, the identifier for the inbound call expected to remain in the queue for at least a minimum amount of time, and the inbound call becoming disconnected with the contact center;
monitor one or more parameters associated with inbound calls received by the contact center; and
after detecting the condition and before the available agent services the inbound call:
remove the identifier for the inbound call from the queue so that the available agent is no longer required to service the inbound call; and
upon the one or more parameters reaching one or more threshold values, send a text message to a processing device associated with the party who placed the inbound call, the text message comprising priority information that can be used upon placing a subsequent inbound call to the contact center to facilitate the contact center prioritizing the subsequent inbound call over at least one other inbound call received by the contact center.

9. The non-transitory, computer-readable medium of claim 8, wherein the one or more parameters comprise at least one of a number of agents currently available to handle inbound calls, an average wait time for inbound calls placed in the queue, a total number of calls currently in the queue, a number of agents scheduled to begin work, and a volume of inbound calls forecasted to be received by the contact center for a future period of time.

10. The non-transitory, computer-readable medium of claim 8, wherein the text message comprises a phone number configured to be selected by the party to originate the subsequent inbound call by the processing device to the contact center.

11. The non-transitory, computer-readable medium of claim 8, wherein the computer-executable instructions are further configured when executed to cause the at least one computer processor to verify the party has provided consent to receiving the text message on the processing device prior to sending the text message to the processing device.

12. The non-transitory, computer-readable medium of claim 8, wherein the computer-executable instructions are further configured when executed to cause the at least one computer processor to provide an appropriate time in the text message during which the party should place the subsequent inbound call to the contact center.

13. The non-transitory, computer-readable medium of claim 8, wherein the computer-executable instructions are further configured when executed to cause the at least one computer processor to:
request the priority information from the party upon the contact center receiving the subsequent inbound call from the party; and
place an identifier for the subsequent inbound call into the queue at a position having a higher priority than the at least one other inbound call received by the contact center upon receiving the priority information from the party.

14. The non-transitory, computer-readable medium of claim 8, wherein the text message further comprises a time period in which the party should place the subsequent inbound call to the contact.

15. A system for providing a callback text message to a party who has placed an inbound call received by a contact center, the system comprising at least one computer processor configured to:
place an identifier for the inbound call into a queue to wait for an available agent for the contact center who can service the inbound call;
after placing the identifier for the inbound call into the queue, detect a condition, the condition comprising at least one of the identifier for the inbound call remaining in the queue for at least a minimum amount of time, the identifier for the inbound call expected to remain in the queue for at least the minimum amount of time, and the inbound call becoming disconnected with the contact center;
monitor one or more parameters associated with inbound calls received by the contact center; and
after detecting the condition and before the available agent services the inbound call:

remove the identifier for the inbound call from the queue so that the available agent is no longer required to service the inbound call; and upon the one or more parameters reaching one or more threshold values, send a text message to a processing device associated with the party who placed the inbound call, the text message comprising priority information that can be used upon placing a subsequent inbound call to the contact center to facilitate the contact center prioritizing the subsequent inbound call over at least one other inbound call received by the contact center.

16. The system of claim 15, wherein the one or more parameters comprise at least one of a number of agents currently available to handle inbound calls, an average wait time for inbound calls placed in the queue, a total number of calls currently in the queue, a number of agents scheduled to begin work, and a volume of inbound calls forecasted to be received by the contact center for a future period of time.

17. The system of claim 15, wherein the text message comprises priority information that can be used by the party upon placing the subsequent inbound call to the contact center to facilitate the contact center prioritizing the subsequent inbound call over other inbound calls received by the contact center.

18. The system of claim 15, wherein the text message comprises a phone number configured to be clicked by the party to originate the subsequent inbound call by the processing device to the contact center.

19. The system of claim 15, wherein the at least one computer processor is further configured to verify the party has provided consent to send the text message to the processing device prior to sending the text message to the processing device.

20. The system of claim 15, wherein the at least one computer processor is further configured to provide an appropriate time in the text message during which the party should place the subsequent inbound call to the contact center.

21. The system of claim 15, wherein the at least one computer processor is further configured to:
request the priority information from the party upon the contact center receiving the subsequent inbound call from the party; and
place an identifier for the subsequent inbound call into the queue at a position having a higher priority than the at least one other inbound call received by the contact center upon receiving the priority information from the party.

22. The system of claim 15, wherein the text message further comprises a time period in which the party should place the subsequent inbound call to the contact.

* * * * *